United States Patent [19]
Tanamachi et al.

[11] Patent Number: 6,094,183
[45] Date of Patent: Jul. 25, 2000

[54] PLASMA ADDRESSED LIQUID CRYSTAL DISPLAY DEVICE

[75] Inventors: Shoichi Tanamachi; Kazuto Kimura, both of Kanagawa, Japan

[73] Assignee: Sony Corporation, Tokyo, Japan

[21] Appl. No.: 08/149,627

[22] Filed: Nov. 9, 1993

[30]    Foreign Application Priority Data

Nov. 9, 1992 [JP]  Japan .................................. 04-325007
Jan. 14, 1993 [JP]  Japan .................................. 05-021995
May 7, 1993 [JP]  Japan .................................. 05-131460

[51] Int. Cl.$^7$ ...................................................... G09G 3/28
[52] U.S. Cl. .............................................................. 345/60
[58] Field of Search .................................. 345/60, 55, 62, 345/37, 41, 87; 359/54, 81; 349/155; 445/24; 430/20

[56]                References Cited

U.S. PATENT DOCUMENTS 4,682,858  7/1987  Kanbe et al. .............................. 359/81
5,221,979  6/1993  Kim ........................................... 345/60
5,338,240  8/1994  Kim ........................................... 359/81

FOREIGN PATENT DOCUMENTS 0500085  8/1992  European Pat. Off. .

OTHER PUBLICATIONS

Patent Abstract of Japan, vol. 10, No. 34 (P–427) published Sep. 18, 1985.

*Primary Examiner*—Vivian Chang
*Attorney, Agent, or Firm*—Hill & Simpson

[57]                ABSTRACT

A plasma addressed liquid crystal display device is disclosed wherein the dimension of a gap of a liquid crystal cell is controlled uniformly over the entire area of the screen of the display device. The display device comprises a first substrate having a plurality of striped data electrodes formed substantially in parallel on a major surface thereof, a second substrate disposed in an opposing relationship to the first substrate and having a plurality of discharge electrodes formed thereon perpendicularly to the data electrodes, an intermediate sheet interposed between the first and second substrates and cooperating with the second substrate to define a discharge chamber between them, a plurality of barrier ribs having top surfaces for contacting in a contacting pattern with a surface of the intermediate sheet, an adhesive spacer interposed between the first substrate and the intermediate sheet and adhered to and cooperating with the other surface of the intermediate sheet to define a gap, the adhesive spacer having a pattern corresponding to the contacting pattern, and a liquid crystal layer enclosed in the gap and having a thickness determined by the adhesive spacer.

17 Claims, 16 Drawing Sheets

FIG. I

PLASMA ADDRESSED LIQUID CRYSTAL DISPLAY DEVICE

BACKGROUND OF THE INVENTION

1. Field of the Invention

This invention relates to a plasma addressed liquid crystal display device having a two-layer structure including two layers of a liquid crystal cell and a plasma cell, and more particularly to a gap controlling structure for a liquid crystal cell of a plasma addressed liquid crystal display device of the type mentioned.

2. Description of the Related Art

A liquid crystal display device of the matrix type conventionally employs, as commonly known as means for assuring a high resolution and a high contrast, an active matrix addressing system wherein a switching element such as a thin film transistor is provided for each picture element and the switching elements are driven in a line sequential condition. However, according to the active matrix addressing system, it is necessary to provide a large number of semiconductor elements such as thin film transistors on a substrate. Accordingly, the active matrix addressing system is disadvantageous in that, when the substrate has a large area, the yield in production is low.

A solution to the disadvantage has been proposed by Buzak et al. and is disclosed in Japanese Patent Laid-Open Application No. Heisei 1-217396 wherein a plasma switch is employed in place of a switching element formed from a thin film transistor or a like element. Now, an outline of general construction of a plasma addressed liquid crystal display device wherein a liquid crystal cell is driven making use of a switch based on plasma discharge will be descried. Referring to FIG. 11, the plasma addressed liquid crystal display device shown has a layered flat panel structure which includes a liquid crystal cell 101, a plasma cell 102 and a common intermediate sheet 103 interposed between the liquid crystal cell 101 and the plasma cell 102. The plasma cell 102 is formed using a glass substrate 104 and has a plurality of striped grooves 105 formed on a surface thereof. The grooves 105 extend, for example, in the direction along a row of a matrix. The grooves 105 are individually closed up by the intermediate sheet 103 to define plasma chambers 106 which are individually separate from each other. Ionizable gas is enclosed in the plasma chambers 106. A convex portion 107 of the glass substrate 104 in the form of a rib is disposed between each adjacent ones of the grooves 105 and serves as a barrier rib for isolating the adjacent plasma chambers 106 from each other. A pair of parallel discharge electrodes are provided on a curved bottom surface of each of the grooves 105 and function as an anode A and a cathode K to ionize the gas in the corresponding plasma chamber 106 to produce discharge plasma. Such discharge area makes a row scanning unit.

Meanwhile, the liquid crystal cell 101 is constructed using a transparent substrate 108. The substrate 108 is disposed in an opposing relationship to the intermediate sheet 103 with a predetermined gap left therebetween, and a liquid crystal layer 109 is filled in the gap. Signal electrodes 110 are formed on an inner surface of the substrate 108. The signal electrodes 110 extend perpendicularly to the plasma chambers 106 and make column driving units. Picture elements in a matrix are defined at intersecting positions between the column driving units and the row scanning units.

In the display device having such a construction as described above, the plasma chambers 106 in which plasma discharge occurs are selectively scanned in a line sequential condition while an image signal is applied to the signal electrodes 110 of the liquid crystal cell 101 in synchronism with such scanning to effect display driving of the display device. If plasma discharge occurs in a plasma chamber 106, then the potential of the inside of the plasma chamber 106 is put substantially uniformly to that of the anode A so that picture element selection of the row is performed. In other words, each of the plasma chamber 106 functions as a sampling switch. If an image signal is applied to a picture element of a plasma sampling switch while the plasma sampling switch is in an on state, then sampling holding takes place so that lighting or extinction of the picture element can be controlled. Also after the plasma sampling switch is put into an off state, the image signal is held as it is in the picture element.

In the conventional plasma addressed liquid crystal display device of the structure described above, the discharge electrodes are formed on the curved bottom surfaces of the grooves 105 such that an anode A and a cathode K in each pair are disposed in an opposing relationship to each other in an inclined condition. In this structure, a route of plasma discharge is formed between the electrode surface of an anode A to the electrode surface of an opposing cathode K, and accordingly, comparatively stable plasma discharge can be obtained. However, in order to realize such electrode structure as described above, it is necessary to form the striped grooves 105 on the surface of the substrate 104, but this involves considerable difficulty in production, and particularly it is very difficult to provide a stripe pattern in a high density. Also, it is complicated and difficult to actually form discharge electrodes in the individual grooves 105 making use of an etching process.

In order to solve such drawbacks of the conventional plasma addressed liquid crystal display devices, a plasma addressed liquid crystal display device which is easy to manufacture and is suitably used to produce a screen of a large size and/or a high resolution has been proposed and is disclosed, for example, in Japanese Patent Laid-Open Application No.

Heisei 4-265931. The structure of the plasma addressed liquid crystal display device will be described subsequently with reference to FIG. 12.

Also the display device has a flat panel structure wherein a liquid crystal cell 201 and a plasma cell 202 are layered with each other with an intermediate sheet 203 interposed therebetween. The liquid crystal cell 201 has a basically same structure as the liquid crystal cell 101 shown in FIG. 11. Ionizable gas is enclosed between the intermediate sheet 203 and a lower substrate 204 to form a plasma chamber 205. A plurality of striped discharge electrodes 206 are formed on an inner surface of the substrate 204. Since the discharge electrodes 206 can be formed on a flat substrate by screen printing or a like technique, the productivity and the operability are high and the discharge electrodes 206 can be formed finely. A barrier rib 207 is formed on each of the discharge electrodes 206, and the barrier ribs 207 divide the plasma chamber 205 into several discharge regions which make row scanning units. Also the barrier ribs 207 can be formed by screen printing or a like technique, and the top ends thereof contact with the lower surface of the intermediate sheet 203. The striped discharge electrodes 206 alternately function as an anode A and a cathode K and cause plasma discharge between them.

Also with the plasma addressed liquid crystal display device of the structure shown in FIG. 12, there remains a subject to be solved. For example, it is difficult to arrange the striped barrier ribs 207 in a fixed height as seen from FIG. 13. Consequently, the intermediate sheet 203 which are supported by the top ends of the barrier ribs 207 cannot be held flat and the thickness of the liquid crystal layer 208 is varied locally. Such irregularity in thickness of the liquid crystal layer 208 significantly deteriorates the quality of an image displayed by the liquid crystal layer 208. Particularly, since the intermediate sheet 203 which isolates the liquid crystal cell 201 and the plasma cell 202 from each other has a very small thickness of approximately 50 μm, it is deformed readily and cannot maintain its flatness.

In order to control the gap of the liquid crystal cell 201 uniformly, it is a conventional countermeasure to spray particulates 209 of a fixed particle size at random. Such particulates 209 are present in the gap and can act effectively to some degree against deformation in a compression direction to keep the dimension of the gap fixed. However, where the density of the particulates 209 sprayed is restricted comparatively low, they cannot sometimes bear the compression force. Meanwhile, as for deformation in an expansion direction, the particulates 209 cannot keep the dimension of the gap fixed. Normally, gas which is ionizable under the pressure lower than the atmospheric pressure is enclosed in the plasma cell 202 on the lower side of the intermediate sheet 203. Accordingly, the intermediate sheet 203 is inclined to be deformed downwardly by a negative pressure to increase the dimension of the gap. In this instance, even if the particulates 209 are sprayed at random so as to be present in the gap, they float in the liquid crystal layer 208 and do not function effectively.

SUMMARY OF THE INVENTION

It is an object of the present invention to provide a plasma addressed liquid crystal display device wherein the dimension of a gap of a liquid crystal cell is controlled uniformly over the entire area of the screen of the display device.

In order to attain the object described above, according to the present invention, there is provided a plasma addressed liquid crystal display device, which comprises a first substrate having a plurality of striped data electrodes formed substantially in parallel to each other on a major surface thereof, a second substrate disposed in an opposing relationship to the first substrate and having a plurality of discharge electrodes formed thereon to extend in a direction perpendicular to the data electrodes, an intermediate sheet interposed between the first and second substrates and cooperating with the second substrate to define a discharge chamber between them, a plurality of barrier ribs having top surfaces for contacting in a contacting pattern with a surface of the intermediate sheet, an adhesive spacer interposed between the first substrate and the intermediate sheet and adhered to the other surface of the intermediate sheet to define a gap between the first substrate and the intermediate sheet, the adhesive spacer having a pattern corresponding to the contacting pattern, and a liquid crystal layer enclosed in the gap and having a thickness determined by the adhesive spacer.

Preferably, the adhesive spacer has a dot pattern.

Preferably, the barrier ribs are made of an insulating material. Each of the barrier ribs may be aligned with a corresponding one of the discharge electrodes. The barrier ribs may be intermittent barrier ribs formed individually on the discharge electrodes. The barrier ribs may be arranged so as to extend in a direction perpendicular to the discharge electrodes. Each of the barrier ribs may have a base portion extending along a corresponding one of the discharge electrodes and top ends arranged in the contacting pattern. The top ends may have flattened surfaces formed by polishing and lying in a common plane. Alternatively, each of the barrier ribs may have a stacked structure including the base portion and top end portions formed by printing.

Each of the barrier ribs may be partly made of an electrically conductive material so that the side portion of the electrically conductive material is comprises of each of the discharge electrodes.

Each of the barrier ribs may be formed on a corresponding one of the discharge electrodes. Preferably, the barrier ribs have a width smaller than that of the discharge electrodes.

Preferably, the adhesive spacer is formed from particulates of an adhesive. The particulates may be deposited in the contacting pattern of the barrier ribs.

The particulates may be formed by screen printing.

The thickness of the liquid crystal layer may be controlled by setting the inner pressure of the discharge chamber lower than that of the liquid crystal layer.

Preferably, the adhesive spacer is located in an inactive area of a display area of the plasma addressed liquid crystal display device.

In the plasma addressed liquid crystal display device, the adhesive spacer is disposed in the gap between the first substrate and the intermediate sheet. The adhesive spacer is adhered to both of the inner surface of the intermediate sheet and the inner surface of the opposing first substrate so that the gap of the liquid crystal cell is held in a fixed condition. Consequently, an influence of a negative pressure of the plasma cell upon the intermediate sheet can be suppressed, and the thickness of the liquid crystal layer enclosed in the gap can be kept uniform over the entire area of the screen of the plasma addressed liquid crystal display device.

The adhesive spacer has a predetermined pattern, which corresponds to or is held in register with the contacting pattern of the top portions of the barrier ribs with the intermediate sheet. Accordingly, the adhesive spacer itself directly receives the stress applied to the top portions of the barrier ribs, which provides a structure tough against deformation. Consequently, the gap of the liquid crystal cell is fixed uniform, and otherwise possible deterioration in electro-optical characteristic of the plasma addressed liquid crystal display device arising from an uneven thickness of the liquid crystal layer is eliminated. As a result, the quality of display of the plasma addressed liquid crystal display device is enhanced remarkably. Further, the areas in which the barrier ribs are present do not allow transmission of incidence light therethrough and serve as an ineffective display area. Accordingly, even if the adhesive spacer is provided in the areas, this does not sacrifice the effective display area of the liquid crystal cell, the contrast in display is enhanced. In contrast, if spacer particulates are sprayed at random as in the prior art, then the orientation of liquid crystal molecules contacting with the surfaces of the particulates is disturbed, which has a bad influence upon the contrast in display in such a manner as to cause cancellation of polarization of light. Further, where the adhesive spacer is disposed in a dot pattern configuration, the amount of use of spacer particulates can be saved comparing with that of a conventional adhesive spacer produced from spacer particulates sprayed at random on the entire area. Furthermore, where the top portions of the barrier ribs are disposed in a dot pattern, it is easy to work the top ends of them into a flattened condition. Further, where powder of particulates coated with a bonding agent is employed as the adhesive spacer, injection of liquid crystal cell can be performed smoothly and rapidly, and when the powder of particulates is applied by screen printing, the adhesive spacer can be patterned with a high degree of accuracy. Further, where the powder of particulars is employed, since air gaps remain among the particulates, routes of admission for liquid crystal upon injection are assured by the air gaps, and consequently, a liquid crystal injection operation can be performed smoothly and rapidly. In addition, where the powder spacer is employed, particularly the inner pressure of the liquid crystal cell may be set lower than the inner pressure of the plasma cell so that the intermediate sheet may be pressed against the liquid crystal layer to stabilize the particulates. Besides, screens of a same pattern can be used for printing of the powder spacer and printing of the barrier ribs, and consequently, displacement in pitch between patterns can be suppressed.

The above and other objects, features and advantages of the present invention will become apparent from the following description and the appended claims, taken in conjunction with the accompanying drawings in which like parts or elements are denoted by like reference characters.

DETAILED DESCRIPTION OF THE PREFERRED EMBODIMENTS

Figure 1:
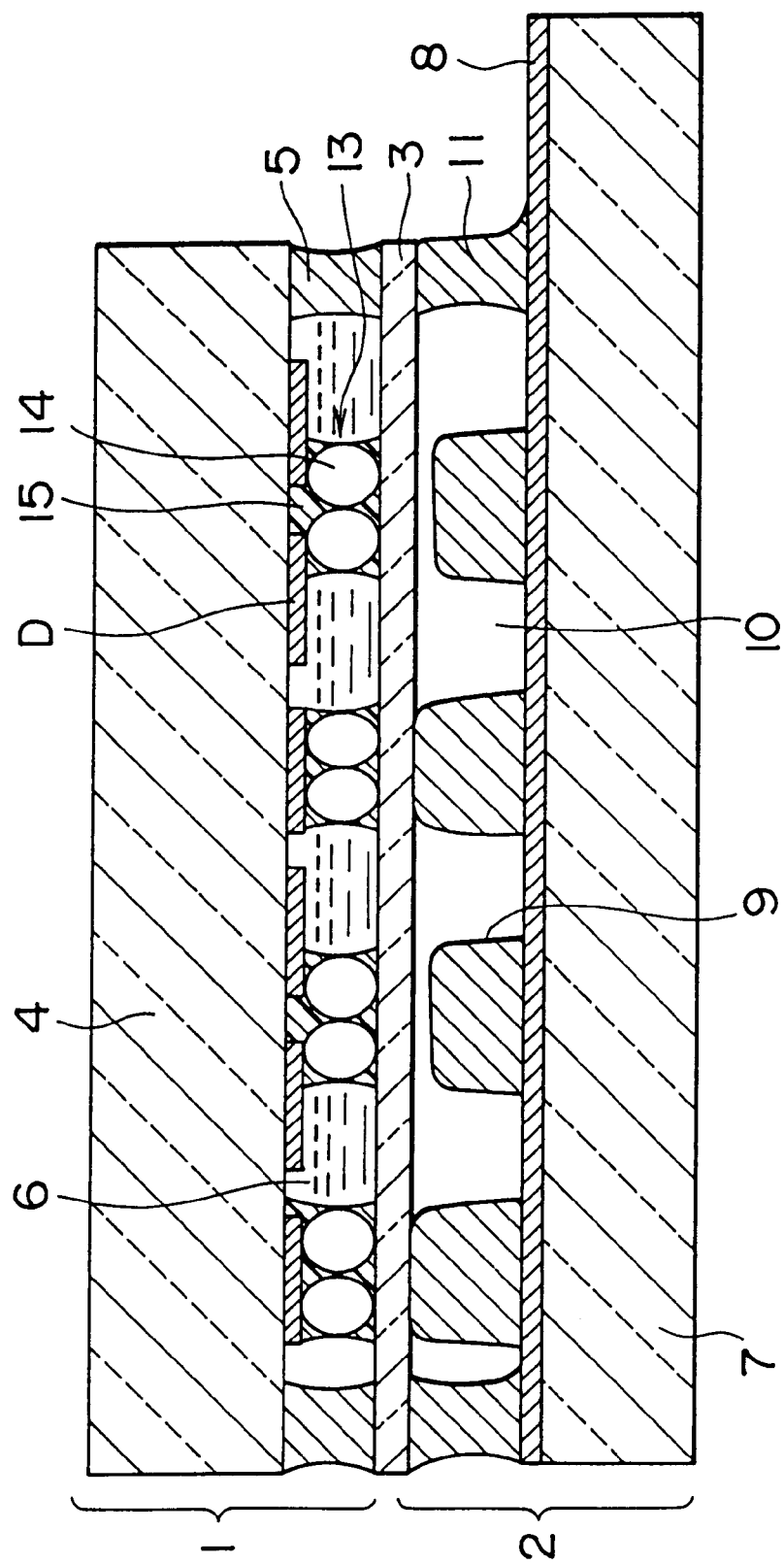
FIG. 1 is a schematic partial sectional view of a plasma addressed liquid crystal display device showing a first preferred embodiment of the present invention.

Referring first to FIG. 1, there is shown a plasma addressed liquid crystal display device according to a first preferred embodiment of the present invention. The plasma addressed liquid crystal display device is shown in section taken in the direction along a row of a matrix, that is, along a signal electrode therein. The plasma addressed liquid crystal display device has a structure wherein a liquid crystal cell 1, a plasma cell 2 and a very thin intermediate sheet 3 are layered with the intermediate sheet 3 interposed between the liquid crystal cell 1 and the plasma cell 2. The liquid crystal cell 1 is constructed using a glass substrate 4, and a plurality of signal electrodes D formed from a transparent conductive film are formed in a stripe pattern on an inner major surface of the glass substrate 4. The substrate 4 is adhered to the intermediate sheet 3 by a seal member 5 with a predetermined gap left between the substrate 4 and the intermediate sheet 3.

The dimension of the gap is set, for example, to approximately 5 $\mu$m. Meanwhile, the intermediate sheet 3 is formed from a thin glass plate or a like member and has the thickness of, for example, approximately 50 $\mu$m. A liquid crystal layer 6 is filled in the gap.

Meanwhile, the plasma cell 2 is constructed using a lower glass substrate 7. A plurality of discharge electrodes 8 are formed in a stripe pattern on an inner major surface of the substrate 7 and extend perpendicularly to the signal electrodes D.

Further, a plurality of barrier ribs 9 are formed individually on the discharge electrodes 8 and extend in the direction of a row of the matrix. Each of the barrier ribs 9 has an intermittent structure wherein it has several recesses 10 formed at a fixed distance therein, and the discharge electrode 8 is partially exposed through the recesses 10. The barrier ribs 9 are held in contact at the top ends thereof with the intermediate sheet 3. When the barrier ribs 9 are formed by screen printing or a like method, the top ends of them are not always in level with each other, but lie at somewhat different heights as seen in FIG. 1. Even if polishing is performed for the top ends of the barrier ribs 9 to flatten them, there still remain some differences in height.

As a characteristic of the present embodiment, the plasma addressed liquid crystal display device includes an adhesive spacer 13 disposed in the gap of the liquid crystal cell 1. The adhesive spacer 13 adheres opposing faces of the intermediate sheet 3 and the glass substrate 4 to each other to fix the dimension of the gap. Accordingly, even if some differences in height remain among the top ends of the barrier ribs 9, a possible influence of them upon the intermediate sheet 3 is eliminated. The adhesive spacer 13 is made of paste consisting of a mixture of particulates 14 having a predetermined particle size and a bonding agent 15. The particulates 14 may be formed from, for example, fragments of glass fiber, high molecular beads or like elements.

The adhesive spacer 13 is provided in a predetermined pattern and disposed, in the plasma addressed liquid crystal display device shown in FIG. 1, corresponding to areas in which the top ends of the barrier ribs 9 contact with the intermediate sheet 3. In other words, the adhesive spacer 13 is disposed in a dot pattern and formed by applying and printing the paste mentioned above, for example, by screen printing. After printing, the paste is pressurized to harden the bonding agent 15. By applying a predetermined pressurizing force, the dimension of the gap of the liquid crystal cell 1 can be controlled uniformly depending upon the particle size of the particulates 14. It is to be noted that relief printing, intaglio printing or photogravure may be employed in place of screen printing. Or else, only a bonding agent may be printed by screen printing, whereafter particulates are sprayed using a predetermined mask. The plasma addressed liquid crystal display device of the present invention is characterized in that the adhesive spacer 13 is provided corresponding to the contacting pattern of the barrier ribs 9.

Figure 2:
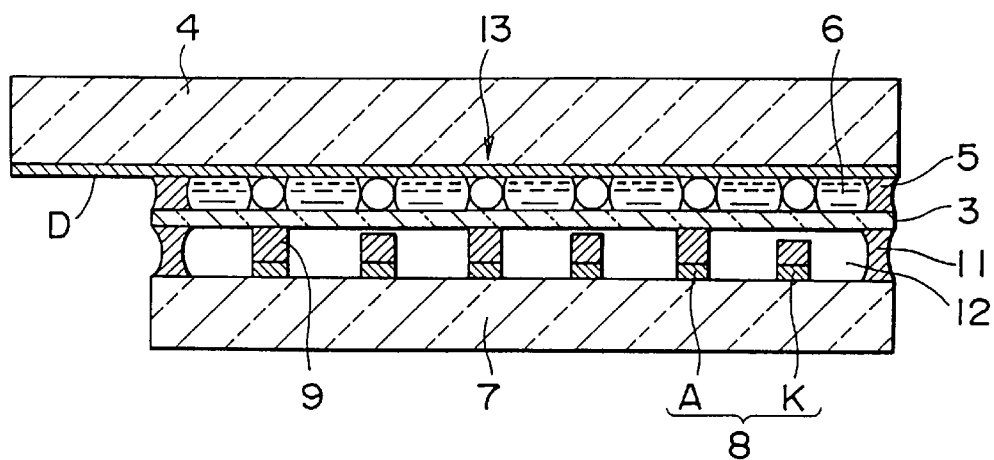
FIG. 2 is a schematic sectional view showing the plasma addressed liquid crystal display device of FIG. 1.

FIG. 2 also shows the plasma addressed liquid crystal display device of the first embodiment, but indicates a cross section of the display device taken along the direction of a column of the matrix, that is, along a direction of a signal electrode. Referring to FIG. 2, the discharge electrodes 8 are formed in a stripe pattern on the inner major surface of the lower substrate 7 and alternately function as an anode A and a cathode K. The discharge electrodes 8 extend perpendicularly to the signal electrodes D. The barrier ribs 9 are individually disposed in register with the discharge electrodes 8. The barrier ribs 9 have a width substantially equal to the width of the discharge electrodes 8. Since each of the barrier ribs 9 has an intermittent structure, the surfaces of the discharge electrodes 8 are exposed partially. The substrate 7 is joined to the intermediate sheet 3 using a frit seal 11. An airtight enclosed plasma chamber 12 is defined between the substrate lower 7 and the intermediate sheet 3. The plasma chamber 12 is sectioned by the intermittent barrier ribs 9, and each of the sections constitutes a discharge area which serves as a row scanning unit. The discharge areas are communicated with each other by way of the recesses 10 formed in the barrier ribs 9, thereby forming a so-called open cell structure. Ionizable gas is enclosed in the inside of the airtight plasma chamber 12. The gas may be selected, for example, from helium, neon, argon or a mixture of them. Further, as described hereinabove, the adhesive spacer 13 is interposed in the gap of the liquid crystal cell 1 and formed by screen printing so that it may be in register with the stripe pattern of the barrier ribs 9.

Figure 3:
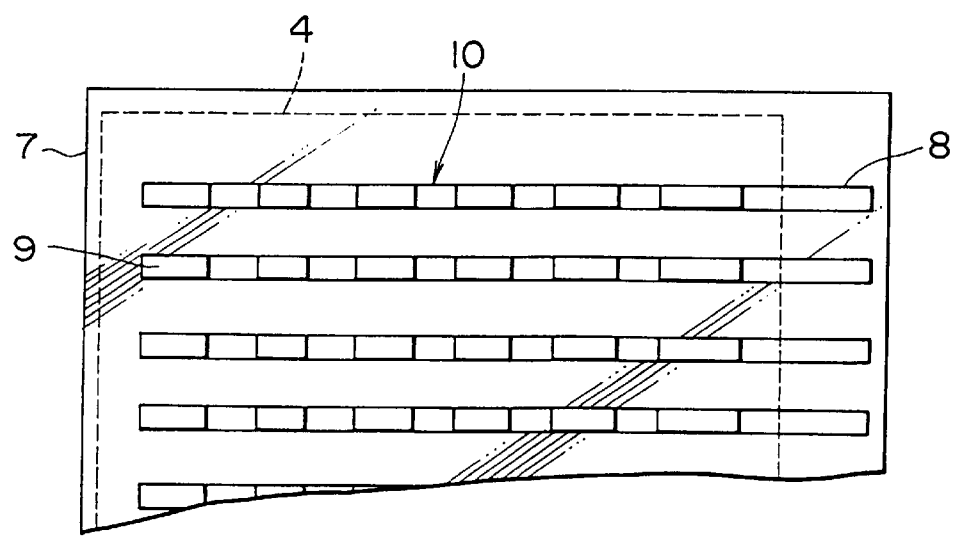
FIG. 3 is a plan view of the plasma addressed liquid crystal display device of FIG. 1.

For reference, the pattern of the lower glass substrate 7 in plan is shown in FIG. 3. It is to be noted that, in order to facilitate understanding, the outer profile of the upper glass substrate 4 is indicated by a dotted line. As described hereinabove, a plurality of discharge electrodes 8 are formed on the surface of the substrate 7 and extend in the direction of a row of the matrix. The discharge electrodes 8 have a thick film electrode structure which can be obtained, for example, by printing and baking glass paste containing nickel or silver using a screen printing method. The barrier ribs 9 having an intermittent structure are provided at a fixed interval in an overlapping relationship with the discharge electrodes 8. Also the barrier ribs 9 can be obtained by printing and baking black glass paste or a like material using a screen printing method. The discharge electrodes 8 on which the intermittent barrier ribs 9 are formed are exposed through the recesses 10 of the barrier ribs 9. If a voltage is applied such that one of a pair of adjacent ones of the discharge electrodes 8 may serve as an anode while the other serves as a cathode, then plasma discharge occurs between the exposed portions of the electrodes 8. Since the plasma at the exposed portions of the discharge electrodes 8 overlaps with each other, the plasma substantially extends continuously along the direction of a row of the matrix, and consequently, a uniform discharge area can be formed.

Figure 4:
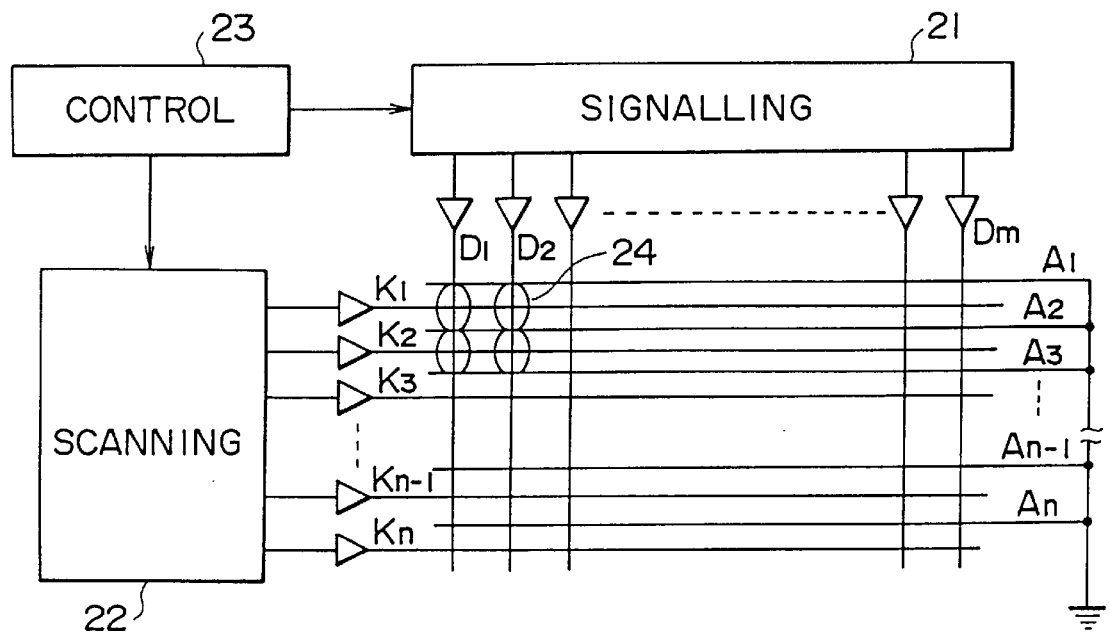
FIG. 4 is a block diagram showing a driver circuit for the plasma addressed liquid crystal display device of FIG. 1.

Subsequently, operation of the plasma addressed liquid crystal display device will be described with reference to FIG. 4. FIG. 4 shows an example of a driver circuit for use with the plasma addressed liquid crystal display device. The driver circuit includes a signalling circuit 21, a scanning circuit 22 and a control circuit 23. Signal electrodes Dl to Dm are connected to the signalling circuit 21 by way of respective buffers. Meanwhile, cathodes Kl to Kn are connected to the scanning circuit 22 similarly by way of respective buffers. Anodes Al to An are grounded commonly. The cathodes Kl to Kn are scanned in a line sequential condition by the scanning circuit 22, and the signalling circuit 21 supplies an image signal to the signal electrodes Dl to Dm in synchronism with the scanning. The control circuit 23 executes synchronization control between the signalling circuit 21 and the scanning circuit 22. A plasma discharge area is formed along each cathode and makes a row scanning unit. Meanwhile, each signal electrode makes a column signal unit. A picture element 24 is defined between the row scanning unit and the column signal unit. Since the anodes Al to An are grounded commonly, the picture elements 24 are formed between the cathodes and the anodes which are located on the opposite sides of the cathodes.

Figure 5:
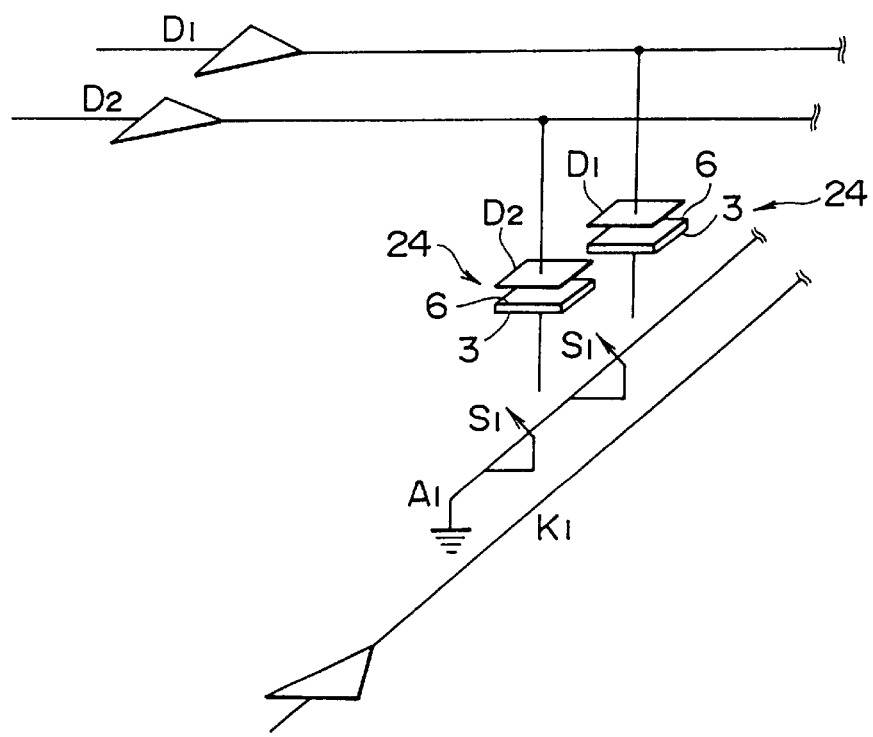
FIG. 5 is a schematic diagrammatic view illustrating picture elements of the plasma addressed liquid crystal display device of FIG. 1.

FIG. 5 schematically shows two picture elements 24 picked up from the picture elements 24 shown in FIG. 4. Referring to FIG. 5, each picture element 24 is constituted from a series connection of a sampling capacitor formed from the signal electrode D1 or D2 and the liquid crystal layer 6 held by the intermediate sheet 3, and a plasma sampling switch S1. The plasma sampling switch S1 equivalently represents a function of a discharge area. In particular, when the discharge area is activated the inside thereof is connected substantially entirely to the anode potential. On the other hand, after plasma discharge comes to an end, the potential of the discharge area is put to a floating potential. An image signal is written into the sampling capacitors of the individual picture elements 24 by way of the sampling switches S1 to effect sampling and holding. Lighting or extinction of each picture element 24 can be controlled in gradation in accordance with the level of the image signal.

Figure 6:
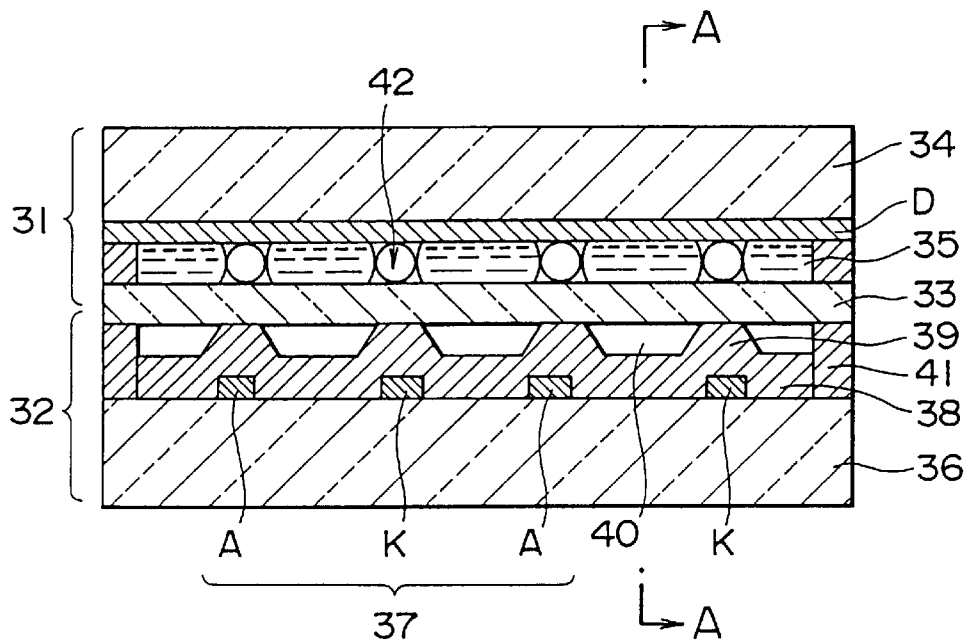
FIG. 6 is a schematic partial sectional view of another plasma addressed liquid crystal display device taken along the direction of a row of a matrix showing a second preferred embodiment of the present invention.

FIG. 6 shows in schematic sectional view another plasma addressed liquid crystal display device according to a second preferred embodiment of the present invention. Referring to FIG. 6, the plasma addressed liquid crystal display device shown has a layered structure wherein a liquid crystal cell 31, a plasma cell 32 and an intermediate sheet 33 formed from a thin dielectric plate are layered with each other with the intermediate sheet 33 interposed between the liquid crystal cell 31 and the plasma cell 32. The liquid crystal cell 31 is constructed using a transparent substrate 34. A plurality of signal electrodes D are formed on an inner major surface of the substrate 24 and aligned with one another in the direction of a column of a matrix. The signal electrodes D are formed from a transparent conductive thin film of ITO or a like material. The substrate 24 is disposed in an opposing relationship to the intermediate sheet 33 with an adhesive spacer 42 of a predetermined thickness interposed between them. A liquid crystal layer 35 is enclosed and filled in a gap defined between the substrate 34 and the intermediate sheet 33.

The plasma cell 32 is constructed using a lower glass substrate 36. Where the plasma addressed liquid crystal display devices is formed as a transmission type display device, a transparent material is used for both of the substrates 34 and 36. Anodes A and cathodes K are formed alternately on an inner surface of the substrate 36. The electrodes A and K serve as discharge electrodes 37. The discharge electrodes 37 are disposed perpendicularly to the signal electrodes D extending in the direction of a column of the matrix and extend perpendicularly to the direction of a row of the column. Further, a plurality of barrier ribs 38 made of an opaque insulating material are formed in a stripe pattern in an overlapping condition with the discharge electrodes 37 on the inner surface of the substrate 36 and extend perpendicularly to the discharge electrodes 37. Accordingly, the barrier ribs 38 extend in the direction of a column of the matrix similarly to the signal electrodes D. Top portions 39 are swollen upwardly at intersecting portions of each of the barrier ribs 38 with the discharge electrodes 37 and held in contact with the intermediate sheet 33. In short, the top portions 39 serve as support posts, and a continuous plasma chamber 40 is formed between the intermediate sheet 33 and the substrate 36. The plasma chamber 40 is sealed at circumferential portions thereof airtight with a frit seal 41. The barrier ribs 38 thus prevent the discharge electrodes 37 from contacting directly with the intermediate sheet 33. Ionizable gas such as, for example, helium, neon, argon or xenon or a mixture of them is enclosed in the inside of the plasma chamber 40.

As a characteristic of the present embodiment, the adhesive spacer 42 is printed in a dot pattern by screen printing such that it may be in register with the top portions 39 of the barrier rib 38. After the screen printing, a pressure and heat are applied to the adhesive spacer 42 to harden the same. Upon pressurization, the gap of the liquid crystal cell 31 is controlled depending upon the particle size of particulates contained in the adhesive spacer 42. In this instance, since the top portions 39 are located below the adhesive spacer 42 with the intermediate sheet 33 interposed between them, they function as support posts, and consequently, a sufficient pressurizing force can be applied upon pressurization. Once the adhesive spacer 42 is hardened, the dimension of the gap is fixed, and thereafter, even if an external pressure acts upon the intermediate sheet 33 by way of the top portions 39, the thickness of the liquid crystal layer 35 is not varied.

Figure 7:
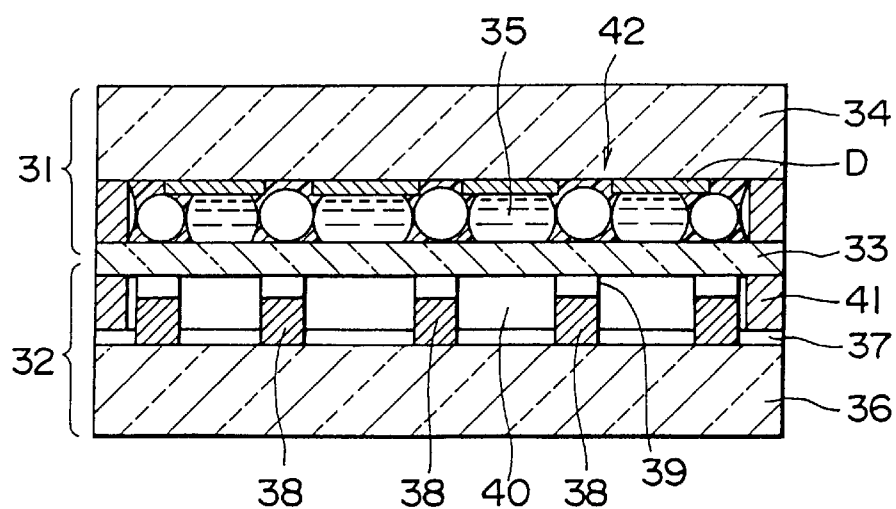
FIG. 7 is a schematic partial sectional view of the plasma addressed liquid crystal display device of FIG. 6 but taken along the direction of a column of the matrix.

FIG. 7 also shows the plasma addressed liquid crystal display device of the second embodiment, but while FIG. 6 indicates a cross section of the display device taken along the direction of a column of the matrix, FIG. 7 indicates a cross section of the display device taken along the direction of a row of the matrix. In particular, FIG. 7 is a sectional view taken along line A—A of FIG. 6. As can be seen apparently from FIG. 7, the barrier ribs 38 are formed in a parallel relationship to the signal electrodes D. In addition, the barrier ribs 38 are disposed such that they are individually in register with gaps between adjacent ones of the signal electrodes D. Similarly, the adhesive spacer 42 is disposed in register with the gaps between the signal electrodes D. The barrier ribs 38 are made of an opaque insulating material and play a roll of black stripe masks for the corresponding gaps. In other words, the barrier ribs 38 have a function of masking the gaps so that crosstalk occurring in the gaps cannot be visually observed from the outside. Simultaneously, also the adhesive spacer 42 is masked effectively from the outside by the black stripe masks. Accordingly, even where the adhesive spacer 42 is disposed in the liquid crystal cell 31, it has no possibility of having a bad influence upon the quality of a display image.

Figure 8:
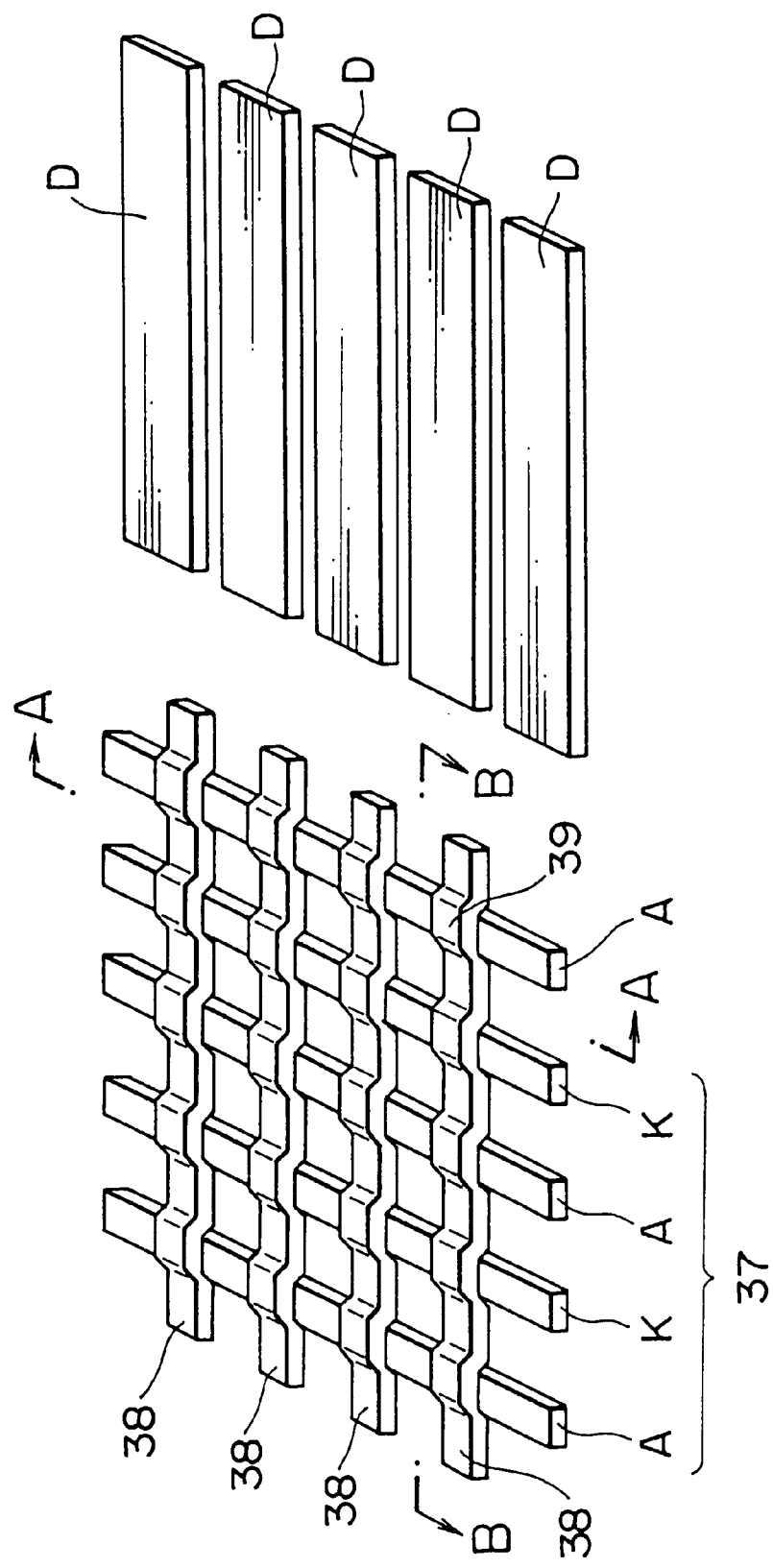
FIG. 8 is a schematic view showing an electrode pattern in the plasma addressed liquid crystal display device of FIG. 6.

For reference, the arrangement pattern of the discharge electrodes and the barrier ribs are shown in FIG. 8. Also the arrangement pattern of the signal electrodes is shown. In addition, the line A—A indicates a sectional line for FIG. 7 while the line B—B indicates another sectional line for FIG. 6. As seen in FIG. 8, the discharge electrodes 37 are spaced by a predetermined distance from each other and extend in the direction of a row of the column. The discharge electrodes 37 are formed by screen printing or a like technique. For example, nickel paste is printed in an overlapping condition by one to fifteen times in elongated rectangular patterns with the width of 50 to 200 $\mu$m. Thick film electrodes of nickel having the thickness of 5 to 200 $\mu$m is formed by baking processing in accordance with an ordinary temperature profile. It is to be noted that the peak temperature of the baking profile is, for example, 570 to 600° C. A desired film thickness can be obtained by suitably setting the number of repetitions of screen printing.

The barrier ribs 38 made of an opaque insulating material are printed in an overlapping relationship with the discharge electrodes 37 along the direction perpendicular to the discharge electrodes 37, that is, along the direction of a column of the matrix. For example, black glass paste is printed repetitively by one to fifteen times in elongated rectangular patterns with the width of 50 to 200 $\mu$m by screen printing. The black glass paste is processed by baking processing in accordance with an ordinary temperature profile (peak temperature: 570 to 600° C.), and a black glass thick film is obtained by the baking processing. A stripe pattern having the thickness of 5 to 200 $\mu$m can be formed by suitably setting the number of repetitions of printing, and the height of the top portions 39 can be adjusted within the range of 10 to 400 $\mu$m. As described hereinabove, the height of the top portions 39 defines the vertical dimension of the gap of the plasma chamber. Simultaneously, the top portions 39 also play the role of support posts for the adhesive spacer 42 formed in the gap of the liquid crystal cell 31. Screen printing of the barrier ribs 38 is performed perpendicularly to the discharge electrodes 37. Accordingly, alignment of the printing screens may be comparatively rough. It is to be noted that the signal electrodes D are formed along the direction of a column of the matrix. In this instance, the opaque barrier ribs 38 are disposed such that they may be in register with the gaps between adjacent ones of the signal electrodes D. Accordingly, so-called crosstalk which occurs in the gaps can be masked effectively so that they may not be visually observed from the outside. Accordingly, also the adhesive spacer 42 described hereinabove can be masked. Consequently, the quality of a display image is enhanced.

Figure 9:
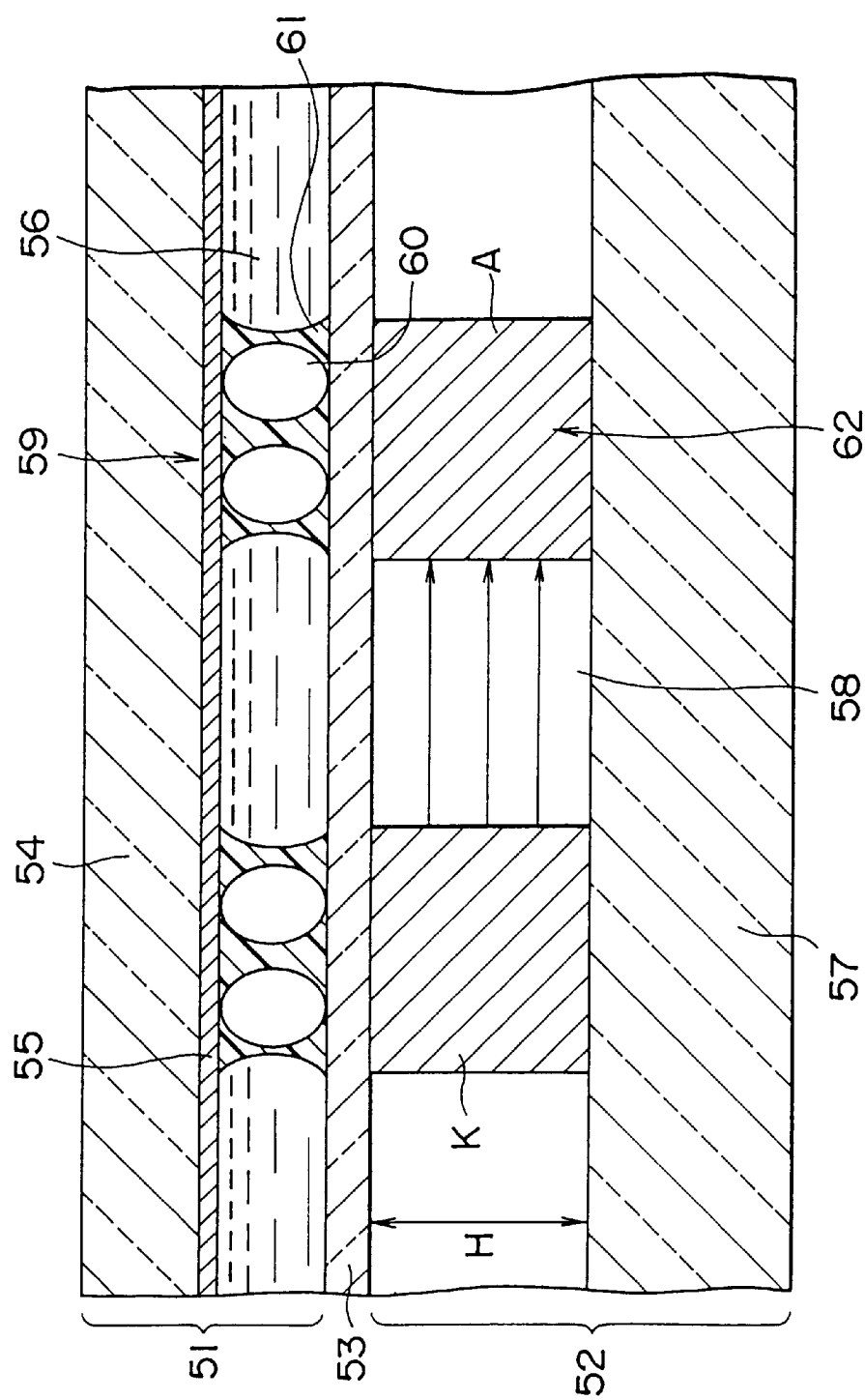
FIG. 9 is a schematic partial sectional view of a further plasma addressed liquid crystal display device showing a third preferred embodiment of the present invention.

FIG. 9 is a partial sectional view of a further plasma addressed liquid crystal display device according to a third preferred embodiment of the present invention and indicates a cross section taken along the direction of a row of a matrix, that is, along the direction of a signal electrode. The plasma addressed liquid crystal display device has a flat panel structure wherein a liquid crystal cell 51, a plasma cell 52 and a very thin intermediate sheet 53 are layered with the intermediate sheet 53 interposed between the liquid crystal cell 51 and the plasma cell 52. The liquid crystal cell 51 is constructed using a glass substrate 54, and a plurality of signal electrodes 55 are formed from a transparent conductive film in a stripe pattern on an inner major surface of the glass substrate 54. The substrate 54 is disposed in an opposing relationship to the intermediate sheet 53 with a fixed gap left between them, and a liquid crystal layer 56 is filled in the gap. An adhesive spacer 59 is provided over the entire area of the screen of the plasma addressed liquid crystal display device in order to assure the fixed gap. The adhesive spacer 59 is made of a mixture of particulates 60 having a particle size corresponding to the dimension of the gap and a bonding agent 61 of a thermosetting resin.

Meanwhile, the plasma cell 52 is constructed using a lower glass substrate 57. A plurality of discharge electrodes 62 are formed in a stripe pattern on an inner major surface of the substrate 57 and extend perpendicularly to the signal electrodes 55. The discharge electrodes 62 alternately function as a cathode K and an anode A. In the plasma addressed liquid crystal display device shown, the width of the discharge electrodes 62 is set to 0.39 mm, and also the distance between the electrodes is set to 0.39 mm. As seen from FIG. 9, the discharge electrodes 62 have a predetermined thickness and are interposed between the intermediate sheet 53 and the glass substrate 57 so as to simultaneously function also as barrier ribs. The height H of the barrier ribs of the plasma electrodes is set to 100 $\mu$m or more. The discharge electrodes can be formed, for example, by repeating thick film screen printing of conductive paste. Generally, the film thickness of electrodes formed by a single operation of printing and baking of a thick film is approximately 15 $\mu$m. In the present plasma addressed liquid crystal display device, the top ends of the discharge electrodes are held in contact directly with the intermediate sheet 53 and serve as barrier ribs. The adhesive spacer 59 is provided in register with the contacting areas between the top ends of the discharge electrodes and the intermediate sheet 53. It is to be noted that the adhesive spacer 59 need not necessarily be patterned like stripes. If injection of liquid crystal is taken into consideration, the adhesive spacer 59 is preferably formed in an intermittent dot pattern rather than a continuous stripe pattern. However, the dot pattern must remain in register with the discharge electrodes 62 which constitute the barrier ribs.

The glass substrate 57 is sealed to the intermediate sheet 53 with a predetermined gap left between them, and a plasma chamber 58 enclosed airtight is defined between the glass substrate 57 and the intermediate sheet 53. The plasma chamber 58 is divided into a plurality of sections by the thick discharge electrodes 62 having a function of barrier ribs, and the plasma chamber sections form discharge areas which individually make row scanning units. Ionizable gas is enclosed in the inside of the airtight plasma chamber 59. As seen in FIG. 9, wall faces of the cathodes K and wall faces of the anodes A are disposed in an opposing relationship to each other by way of the plasma chamber 58 and thus have a wall face electrode structure. The wall face electrode structure is equivalent to a parallel flat plate electrode structure, and discharge routes indicated by arrow marks extend straightforwardly from the wall face of an electrode to the wall face of the opposing electrode. Since no obstacle is present in the discharge routes indicated by the arrow marks, much stabilized plasma discharge or glow discharge can be obtained.

Figure 10:
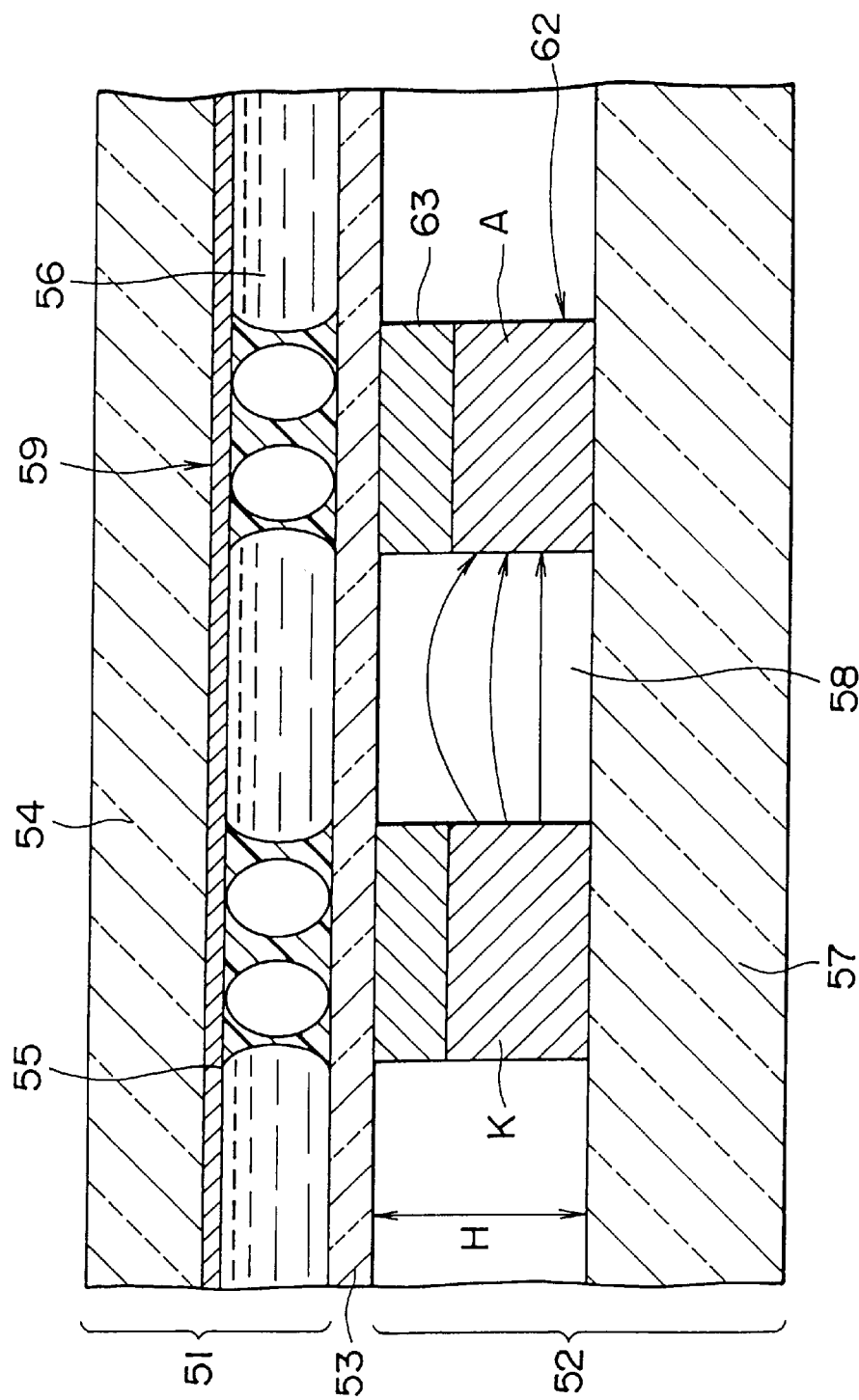
FIG. 10 is a similar view but showing a modification to the plasma addressed liquid crystal display device of FIG. 9.
Figure 11:
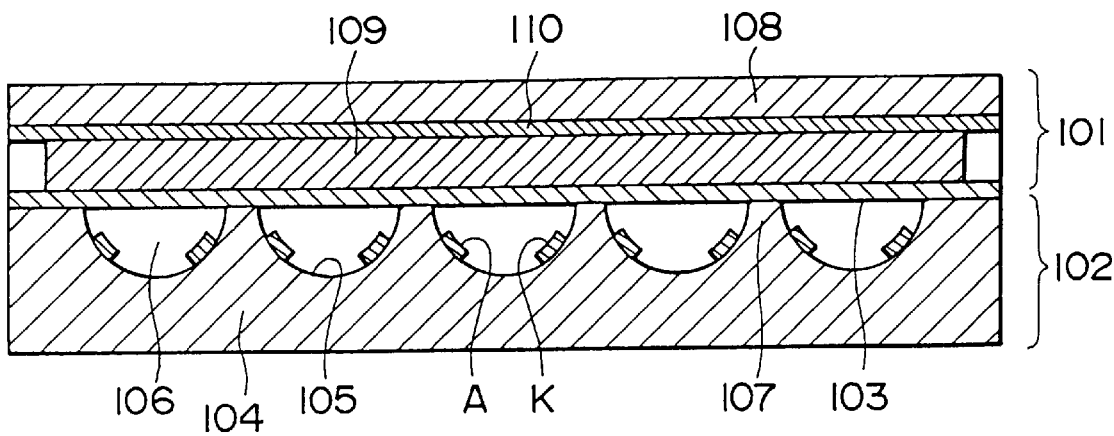
FIG. 11 is a schematic sectional view showing an exemplary one of conventional plasma addressed liquid crystal display devices.
Figure 12:
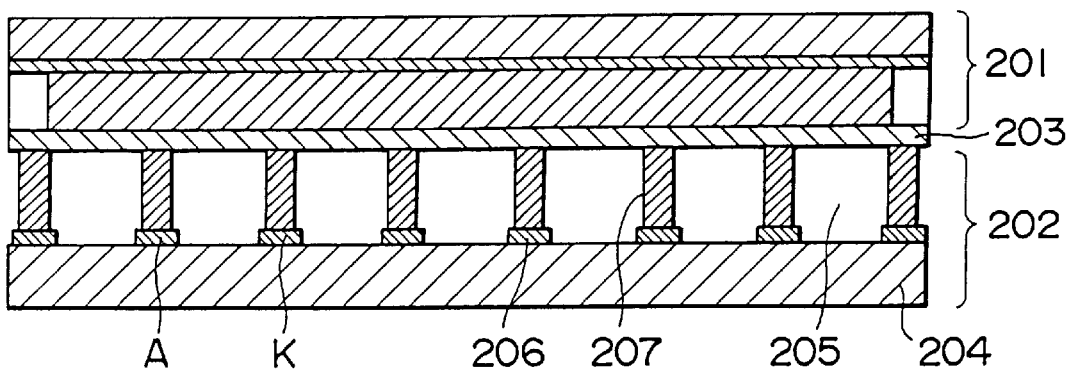
FIG. 12 is a similar view but showing another exemplary one of conventional plasma addressed liquid crystal display devices.

FIG. 10 is a schematic partial sectional view showing a modification to the plasma addressed liquid crystal display device of the third embodiment of the present invention shown in FIG. 3, and in FIG. 10, like elements to those in FIG. 9 are denoted by like reference numerals to facilitate understanding. The modified plasma addressed liquid crystal display device of FIG. 10 is different from the plasma addressed liquid crystal display device of FIG. 9 in that a dielectric layer 63 made of an insulating material is interposed between the thick discharge electrodes 62 and the intermediate sheet 53. Barrier ribs are thus constructed by the layered structure of the dielectric layer 63 and the thick discharge electrodes 62. Since the dielectric layer 63 is present, otherwise possible crosstalk with the signal electrodes 55 on the liquid crystal cell 51 side can be eliminated.

Figure 14:
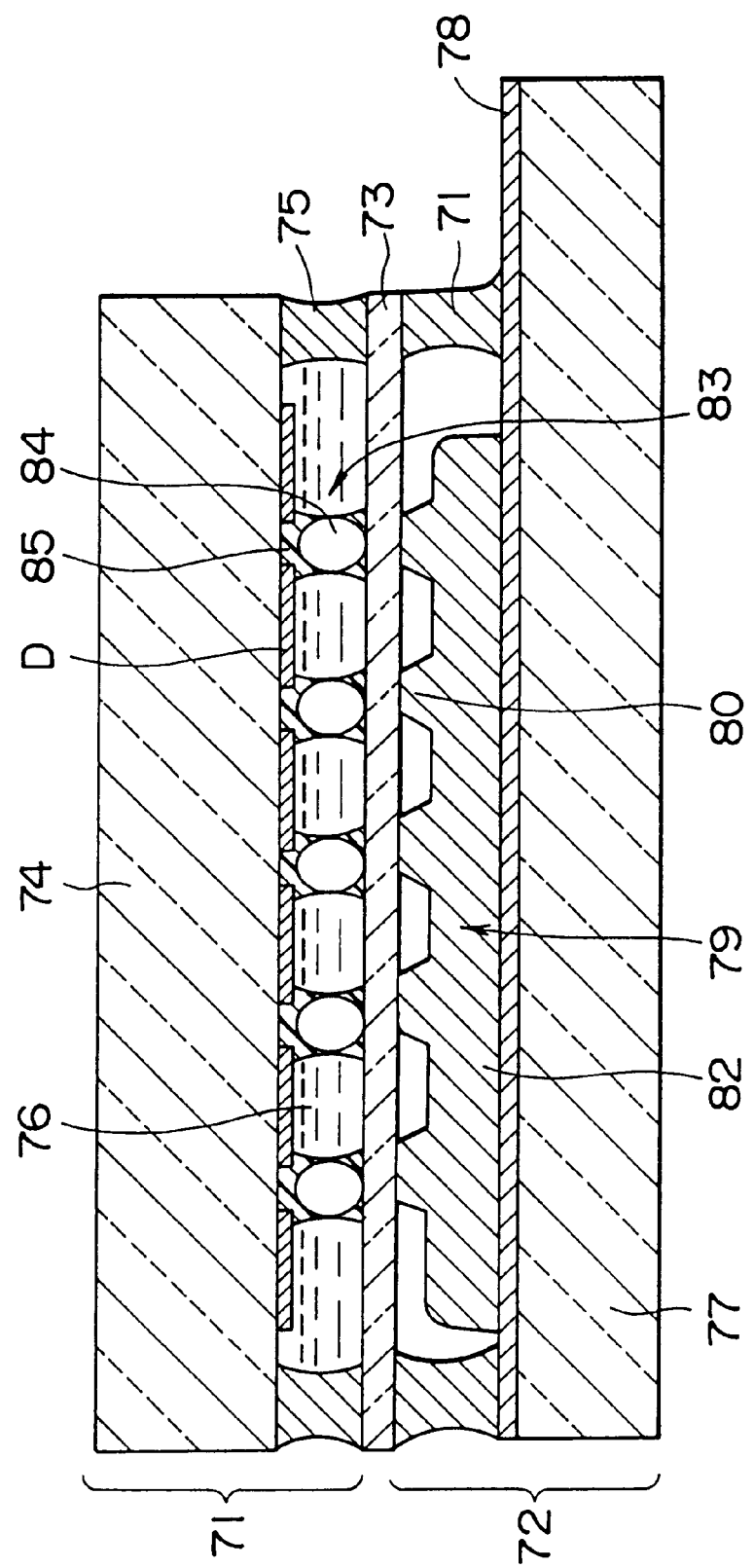
FIG. 14 is a schematic sectional view of a still further plasma addressed liquid crystal display device showing a fourth preferred embodiment of the present invention.

FIG. 14 is a schematic sectional view showing a still further plasma addressed liquid crystal display device according to a fourth preferred embodiment of the present invention and indicates a cross section taken along the direction of a row of a matrix, that is, along the direction of a discharge electrode. Referring to FIG. 14, the plasma addressed liquid crystal display device has a structure wherein a liquid crystal cell 71, a plasma cell 72 and a very thin intermediate sheet 73 are layered with the intermediate sheet 73 interposed between the liquid crystal cell 71 and the plasma cell 72. The liquid crystal cell 71 is constructed using a glass substrate 74, and a plurality of signal electrodes D are formed from a transparent conductive film in a stripe pattern on an inner major surface of the glass substrate 74. The substrate 74 is adhered to the intermediate sheet 73 by a seal member 75 with a predetermined gap left between the substrate 74 and the intermediate sheet 73. The dimension of the gap is set, for example, to approximately 5 $\mu$m. Meanwhile, the intermediate sheet 73 is formed from a thin glass plate or a like member and has the thickness of, for example, approximately 50 $\mu$m. A liquid crystal layer 76 is filled in the gap.

Meanwhile, the plasma cell 72 is constructed using a lower glass substrate 77. A plurality of discharge electrodes 78 are formed in a stripe pattern on an inner major surface of the substrate 77 and extend perpendicularly to the signal electrodes D. Further, a plurality of barrier ribs 79 are formed individually on the discharge electrodes 78 and extend in the direction of a row of the matrix. The barrier ribs 79 are made of an insulating material and each has a base portion 82 disposed like a belt along a corresponding one of the discharge electrodes 78, and a plurality of top portions 80 disposed like dots in a predetermined spaced relationship from each other. The arrangement distance of the top portions 80 coincide, for example, with that of the signal electrodes D. The present invention, however, is not limited to the specific structure. The top portions 80 have flattened polished top faces and are held in contact with the intermediate sheet 73. The intermediate sheet 73 is joined to a lower glass substrate 77 by way of a frit seal 81.

As a characteristic of the present embodiment, the plasma addressed liquid crystal display device includes an adhesive spacer 83 interposed in the gap of the liquid crystal cell 71. The adhesive spacer 83 adheres opposing faces of the intermediate sheet 73 and the glass substrate 74 to each other to fix the dimension of the gap. Accordingly, even if some differences in height remain with the top ends of the barrier ribs 79, a possible influence of them upon the intermediate sheet 73 is eliminated. The adhesive spacer 83 is formed from paste made of a mixture of particulates 84 having a predetermined particle size and a bonding agent 85. The particulates 84 may be formed from, for example, fragments of glass fiber, high molecular beads or like elements. The adhesive spacer 83 is provided in a predetermined pattern and disposed, in the plasma addressed liquid crystal display device shown in FIG. 10, corresponding to areas in which the top portions 80 of the barrier ribs 79 disposed in a dot pattern contact with the intermediate sheet 83. In other words, the adhesive spacer 83 is disposed in a dot pattern and formed by applying and printing the paste mentioned above, for example, by screen printing. The amount of particulates to be used can be reduced by such screen printing. After printing, the paste is heated and pressurized to harden the bonding agent 85. By applying a predetermined pressurizing force, the dimension of the gap of the liquid crystal cell 71 can be controlled uniformly depending upon the particle size of the particulates 84.

Figure 15:
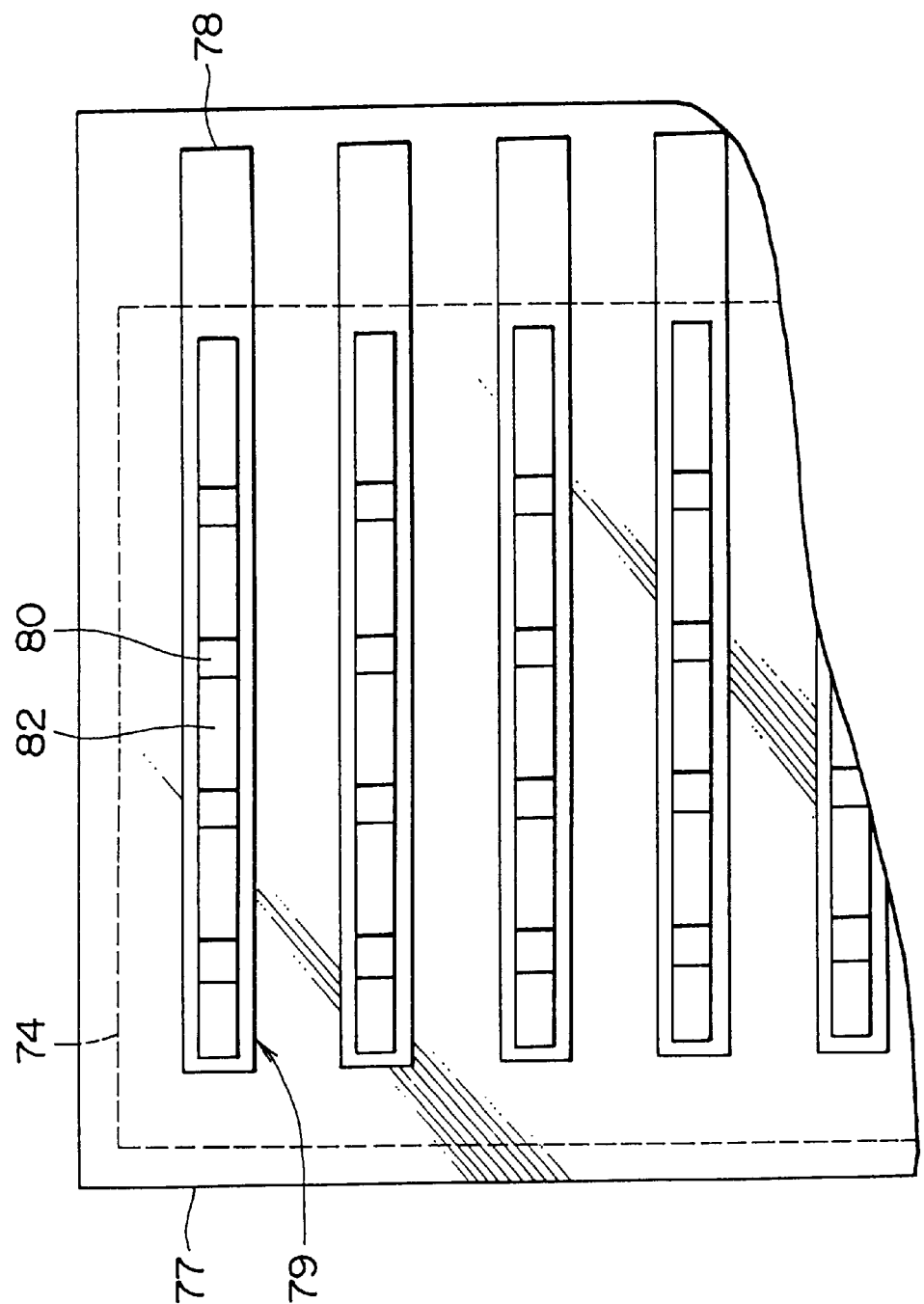
FIG. 15 is a plan view showing electrode patterns and barrier rib patterns in the plasma addressed liquid crystal display device of FIG. 14.

FIG. 15 shows the top plan of the lower glass substrate 77. In order to facilitate understanding, the outer profile of the upper glass substrate 74 is indicated by a dotted line in FIG. 15. Referring to FIG. 15, a plurality of discharge electrodes 78 are formed on the surface of the substrate 77 and extend along the direction of a row of the matrix. The electrodes 78 have a thick film electrode structure which is obtained by printing and baking glass paste containing nickel or silver therein using, for example, a screen printing method. The barrier ribs 79 are provided on and in register with the discharge electrodes 78. In the present plasma addressed liquid crystal display device, the barrier ribs 79 have a structure wherein the base portion 82 and the top portions 80 are overlapped with each other by printing of an insulating material. In particular, black glass paste or a like material is first printed in a belt-like pattern along the discharge electrodes 78 by screen printing to provide the base portions 82. Then, black glass paste or a like material is printed similarly in an overlapping condition like dots by screen printing to provide the top portions 80. Thereafter, the lower glass substrate 77 is baked, and then only the top portions 80 are selectively polished to flatten them. As shown in FIG. 15, the width of the belt-like base portions 82 is smaller than the width of the corresponding discharge electrodes 78. Accordingly, each of the discharge electrodes 78 is exposed at portions thereof on the opposite sides of the corresponding barrier rib 79. If a voltage is applied to each pair of adjacent ones of the discharge electrodes 78 such that one of the discharge electrodes 78 serves as an anode while the other serves as a cathode, plasma discharge occurs between the exposed portions of the electrodes.

Figure 16:
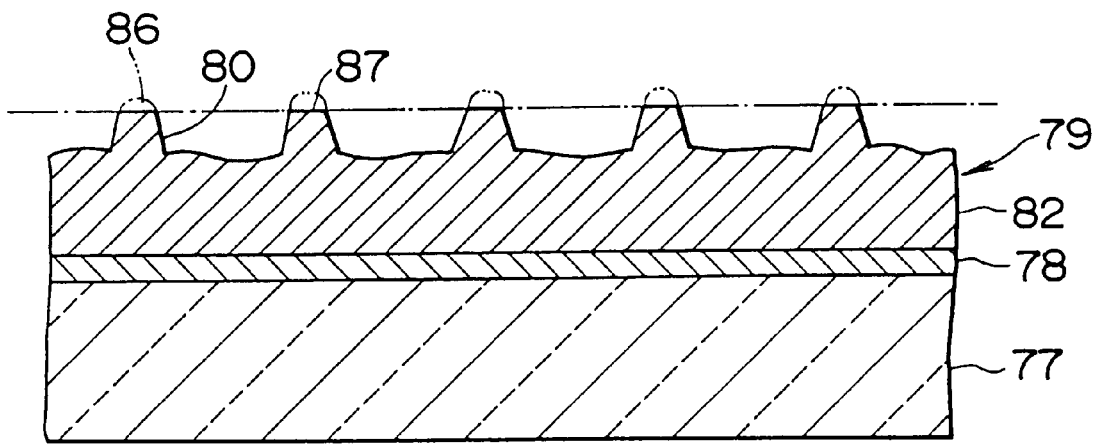
FIG. 16 is a schematic sectional view illustrating a step of forming the barrier ribs in the plasma addressed liquid crystal display device of FIG. 14.

Subsequently, a process of forming the barrier ribs 79 will be described with reference to FIG. 16. First, Ni paste (by Dupon or Okuno Pharmaceutical) is printed on the surface of the substrate 77 and baked to form the discharge electrodes 78. Then, glass paste is printed on and along the discharge electrodes 78 by screen printing to provide the belt-like base portions 82. The thickness of the printed belt-like base portions 82 is, for example, 100 μm and can be obtained by repetitively performing the screen printing step by a desired number of times. Subsequently, glass paste is printed in dots at a predetermined distance in an overlapping relationship with the base portions 82 by screen printing to form the top portions 80. The height of the top portions 80 is, for example, approximately 70 μm. The arrangement distance of the top portions 80 is controlled, for example, to 0.4 mm. Thereafter, final baking is performed to harden the base portions 82 and the top portions 80 simultaneously. In this condition, some difference 86 in height remains between the top ends of the top portions 80. Finally, polishing is performed to a predetermined level as indicated by an alternate long and short dash line in FIG. 16 to remove such difference 86 to flatten the top faces 87 of the top portions 80. As a result of the polishing, the heights of the top portions 80 are uniformed. In the plasma addressed liquid crystal display device of FIG. 16, the top ends of the top portions 80 are removed by the vertical dimension of approximately 20 μm by polishing so that all of the top portions 80 may have the height of 50 μm. Generally, the height is preferably set within the range of 10 to 50 μm. It is to be noted that, while the top portions 80 are formed by screen printing in the process of forming the barrier ribs 79 described above, the present invention is not limited to the specific forming method, but the top portions 80 may alternatively be formed using, for example, a dispenser.

Figure 17:
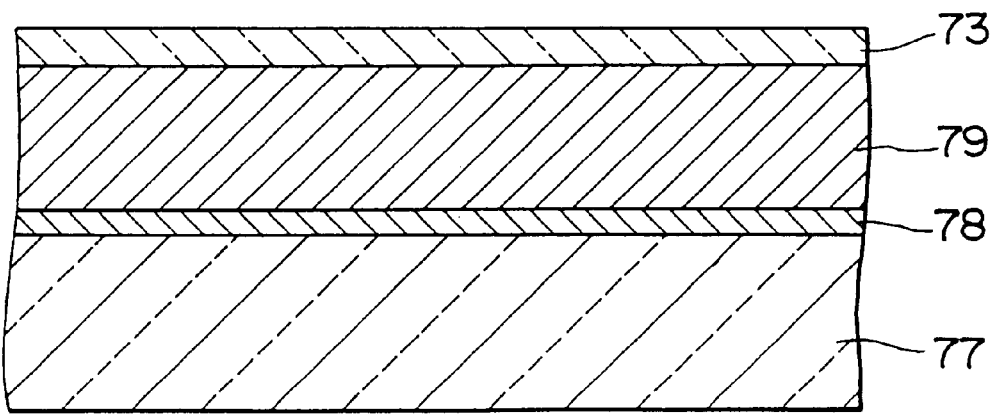
FIG. 17 is a partial schematic sectional view showing a plasma addressed liquid crystal display device for reference.

FIG. 17 shows a comparative example for reference. In order to facilitate understanding, like elements to those of FIG. 16 are denoted by like reference numerals in FIG. 17. Referring to FIG. 17, in the comparative example shown, the barrier ribs 79 are formed like continuous belts extending along the discharge electrodes 78. As described hereinabove, if the barrier ribs 79 are formed by a printing method, then the top ends thereof do not lie in a common plane but marks of a screen mesh or lumps of glass paste remain at the top ends, and consequently, the difference in height among the top ends reaches approximately 70 μm. Therefore, in order to control the gap of the liquid crystal cell uniform, the top portions of the barrier ribs 79 for contacting with the intermediate sheet 73 are polished into a flattened condition so that the barrier ribs 79 may have a same height. However, if the top portions of the barrier ribs 79 are formed like continuous belts as in the comparative example of FIG. 17, then full flattening processing cannot always be performed and very small projections appear at random positions. In order to absorb such irregularity in polishing to control the gap of the liquid crystal cell uniform, also the adhesive spacers must be provided continuously along the belt-like top ends of the barrier ribs. Accordingly, the amount of use of particulates contained in the adhesive spacer is increased. Further, even if the adhesive spacer is supplied continuously along the belt-like top ends of the barrier ribs 79, it is impossible to absorb the irregularly in polishing completely. In contrast, with the arrangement shown in FIG. 16, since the top portions 80 are arranged in dots, polishing of them is very easy, and fully flattened top faces can be obtained.

Figure 13:
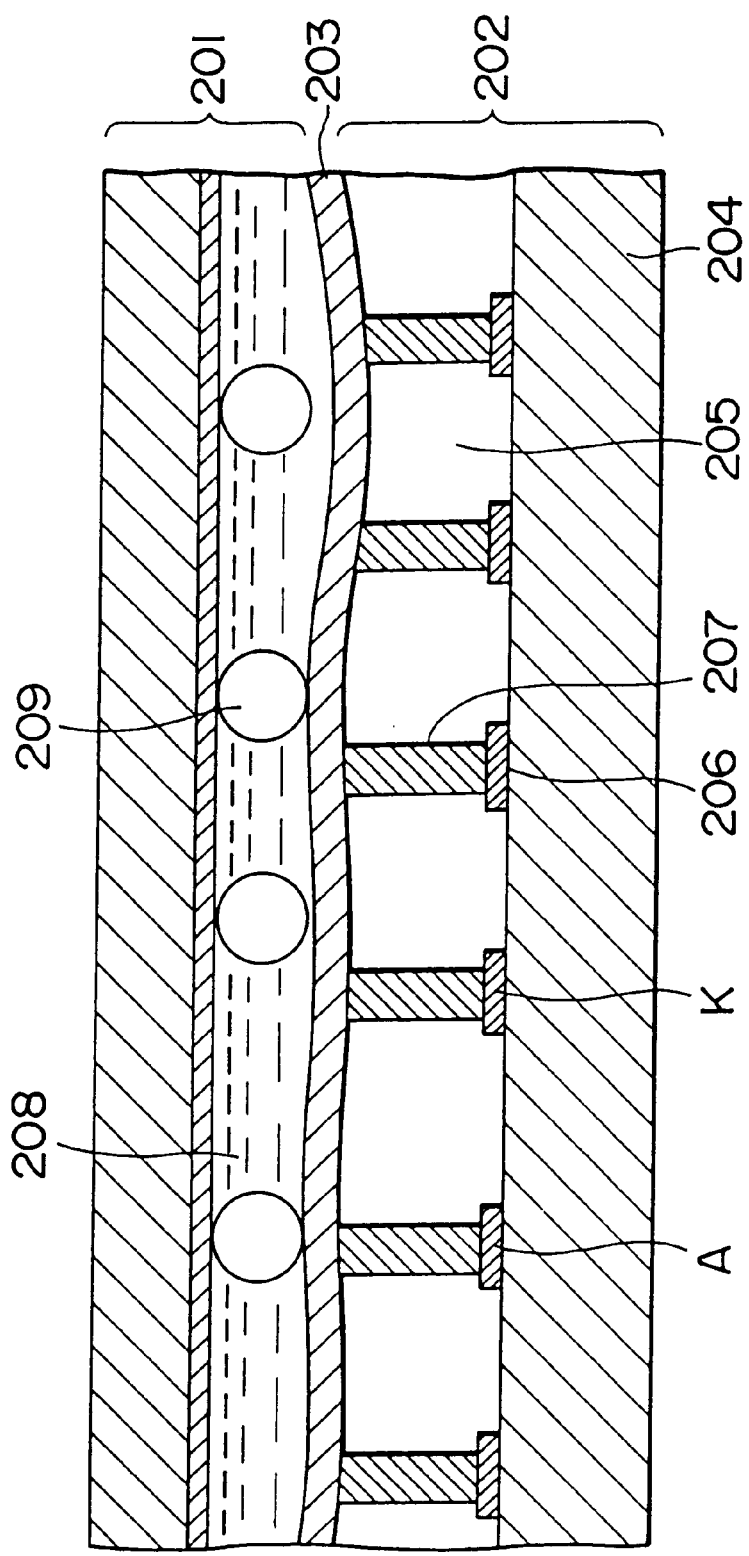
FIG. 13 a schematic sectional view illustrating a subject to be solved of a conventional plasma addressed liquid crystal display device.

Finally, a yet further plasma addressed liquid crystal display device according to a fifth preferred embodiment of the present invention will be described. In order to make the object of the present plasma addressed liquid crystal display device clear, reference is had to FIG. 13 again to briefly describe a subject to be solved particularly of the prior art. As seen in FIG. 13, the plasma chamber 205 is defined between the intermediate sheet 203 and the lower glass substrate 204. The intermediate sheet 203 is supported on the barrier ribs 207. Since the inside of the plasma chamber 205 is kept in fixed vacuum, the stress produced with the intermediate sheet 203 of a very small thickness by the negative pressure acts all upon the top ends of the barrier ribs 207. If the top ends of the barrier ribs 207 generally lie in a common plane, then the gap of the liquid crystal cell 201 is uniform. However, where the barrier ribs 207 are formed particularly by screen printing, projections may remain at the top ends of them or the barrier ribs 207 may be different in height. Consequently, the load may be concentrated upon some of the barrier ribs 207. In the meantime, the particulates 209 making the spacer are sprayed at random with the density of about 150 particulates/mm$^2$. The density of the sprayed particulates is not sufficient to bear the locally concentrated load, and the vertical dimension of the gap of the liquid crystal cell 201 is reduced there. On the contrary where the top ends of barrier ribs 207 are comparatively low, the spacer particulates 209 exhibit a floating condition and the gap of the liquid crystal cell 201 is increased in vertical dimension. The deviation in vertical dimension of the gap results in production of irregularity in color and hence in deterioration of the quality of a display image. The plasma addressed liquid crystal display device of the present embodiment solves such subject of the prior art as just described.

Figure 18:
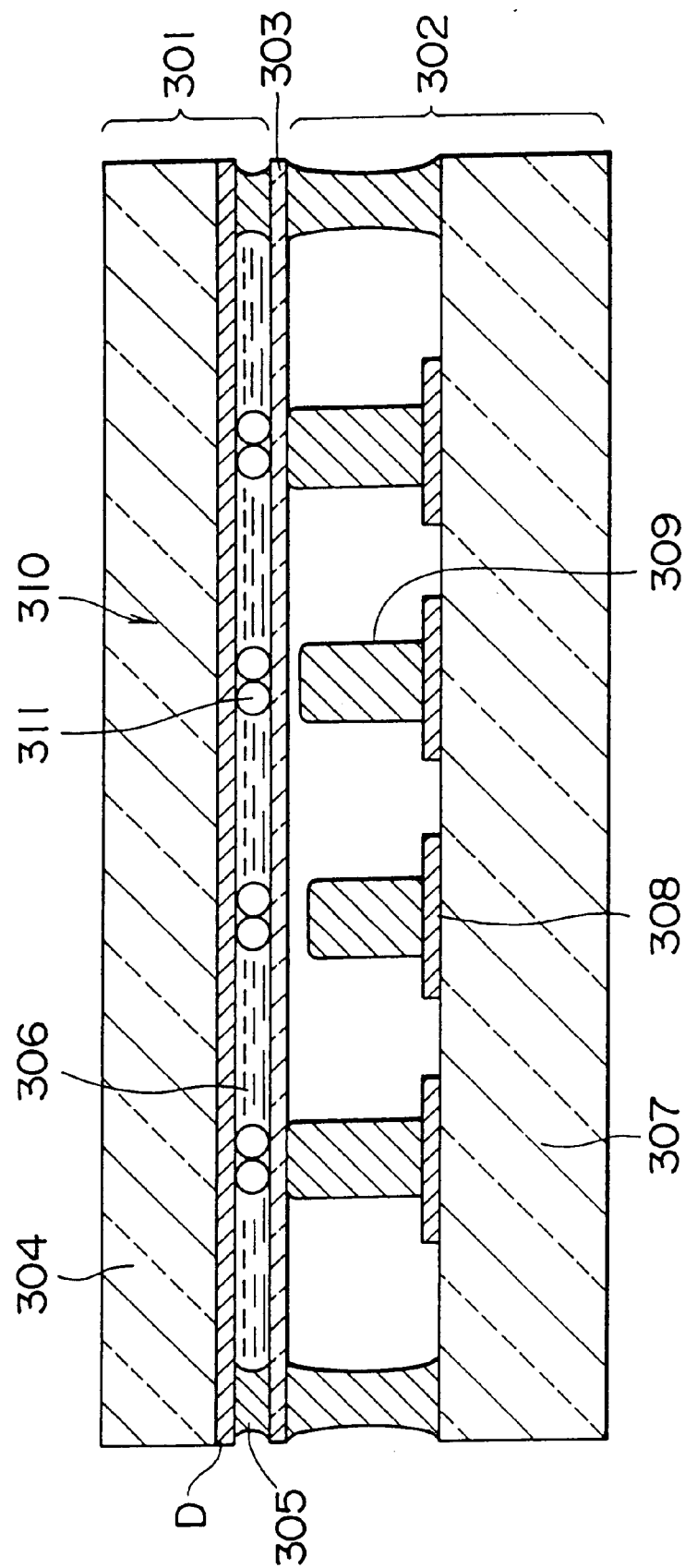
FIG. 18 is a sectional view of a yet further plasma addressed liquid crystal display device showing a fifth preferred embodiment of the present invention.

FIG. 18 is a schematic sectional view showing a yet further plasma addressed liquid crystal display device according to a fifth preferred embodiment of the present invention and indicates a cross section taken along the direction of a row of a matrix, that is, along the direction of a signal electrode. Referring to FIG. 18, the present plasma addressed liquid crystal display device has a structure wherein a liquid crystal cell 301, a plasma cell 302 and a very thin intermediate sheet 303 are layered with the intermediate sheet 303 interposed between the liquid crystal cell 301 and the plasma cell 302. The liquid crystal cell 301 is constructed using a glass substrate 304, and a plurality of signal electrodes D are formed in a stripe pattern on an inner major surface of the glass substrate 304. The substrate 304 is adhered to the intermediate sheet 303 by a seal member 305 with a predetermined gap left between the substrate 304 and the intermediate sheet 303. A liquid crystal layer 306 is filled in the gap. Meanwhile, the plasma cell 302 is constructed using a lower glass substrate 307. A plurality of discharge electrodes 308 are formed in a stripe pattern on an inner major surface of the substrate 307 and extend perpendicularly to the signal electrodes D. Further, a plurality of barrier ribs 309 are formed individually on the discharge electrodes 308 and extend in the direction of a row of the matrix. The barrier ribs 309 are formed, for example, by screen printing, and top portions thereof have somewhat different heights. Accordingly, some of the barrier ribs 309 may not contact at the top ends thereof with the intermediate sheet 303 while some other ones of the barrier ribs 309 are in an excessively contacting condition with the intermediate sheet 303.

As a characteristic of the plasma addressed liquid crystal display device of the present embodiment, an adhesive spacer 310 disposed in the liquid crystal cell 301 is formed from powder of particulates 311 coated with a bonding agent. The powder is disposed along a contacting pattern of the top ends of barrier ribs 309, for example, by screen printing. Upon such screen printing, the inner pressure of the liquid crystal cell 301 is set lower than the inner pressure of the plasma cell 302 to control the gap of the liquid crystal cell 301 fixed. While a paste material comprised of particulates dispersed in a predetermined adhesive resin is employed for the adhesive spacer in the plasma addressed liquid crystal display devices of the first to fourth embodiments described above, a powder material is employed in the plasma addressed liquid crystal display device of the present embodiment. A bonding agent is coated on the surfaces of individual particulates constituting the powder. Accordingly, by applying heat treatment to the powder material, the particulates can be fixed to the intermediate sheet 303 or the upper glass substrate 304. Further, by setting the inner pressure of the liquid crystal cell 301 lower than the inner pressure of the plasma cell 302, the intermediate sheet 303 is pressed against the liquid crystal cell 301 to control the dimension of the gap uniform over the entire screen of the plasma addressed liquid crystal display device. The structure just described is effective to absorb the differences in height of the barrier ribs 309. The spacer particulates 311 are disposed along the contacting pattern of the top ends of the barrier ribs 309. The distribution density of the spacer particulates 311 is set higher than that by the conventional random spray so that the gap may be fixed sufficiently against local concentration of the load. Further, since air gaps remain in the aggregate of the particulates 311, the particulates 311 do not make an obstacle at all to injection of liquid crystal, and consequently, a rapid liquid crystal injecting operation can be achieved.

Figure 19:
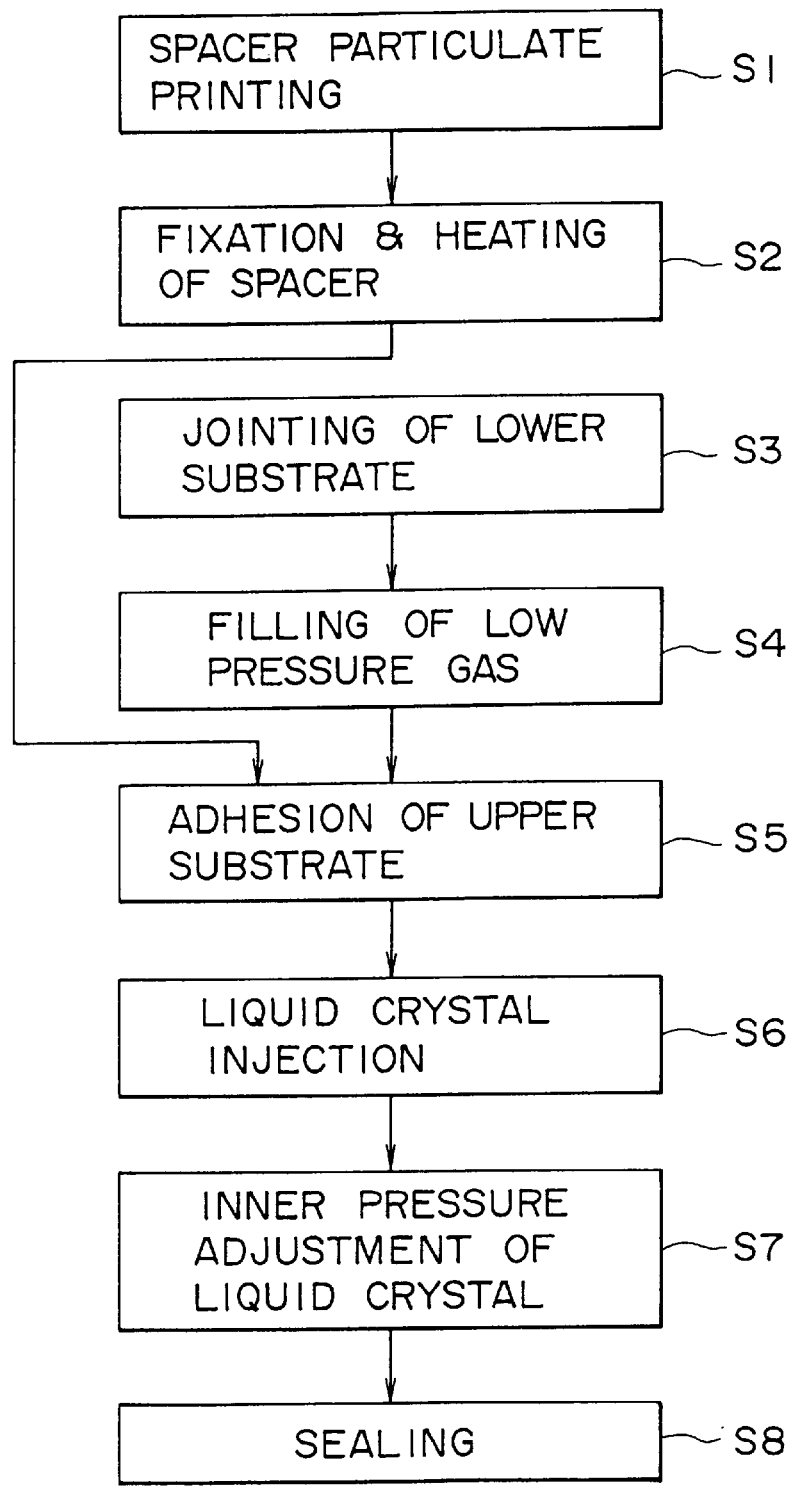
FIG. 19 is a flow chart illustrating a process of manufacturing the plasma addressed liquid crystal display device of FIG. 18.

Subsequently, a process of manufacturing the plasma addressed liquid crystal display device of the fifth embodiment will be described with reference to FIG. 19. First at step S1, spacer powder is printed on the inner surface of the upper glass substrate 304. As described above, the spacer powder is constituted from an aggregate of particulates coated with a bonding agent. The spacer powder is patterned as it is without adding a solvent or a binder to it by screen printing. Since the print pattern is the same as the barrier rib pattern, a possible dispersion in accuracy of the prints or accuracy in printing processing can be suppressed, and substantially no displacement in pitch of them from the barrier ribs occurs. Further, since a solvent or a binder is not used, the printed pattern does not blur and such viscosity management as required for paste is not required. Subsequently at step S2, predetermined heating processing is performed to harden the bonding agent coated on the particulates to fix the printed spacer powder to the glass substrate 304.

In parallel to the steps, the lower substrate 307 and the intermediate sheet 303 are jointed together by means of a frit seal or a like means to produce the plasma cell 302 at step S3. In this instance, the discharge electrodes 308 and the barrier ribs 309 are formed in stripe patterns on the inner surface of the lower substrate 307 in advance. As described hereinabove, the barrier ribs 309 are formed in accordance with the same pattern as the printed pattern of the spacer powder. Subsequently at step S4, ionizable gas is injected at a low pressure into the inside of the plasma cell 302. The pressure then is set, for example, to 160 Torr. Since the pressure is lower than the atmospheric pressure (760 Torr), the intermediate sheet 303 of a very small thickness is pressed against the lower glass substrate 307 by the negative pressure, and consequently, the surface of the intermediate sheet 303 is in a somewhat uneven condition.

Then at step S5, the upper glass substrate 304 onto which the spacer powder has been printed is adhered to the intermediate sheet 303 to assemble the liquid crystal cell 301. In this instance, the upper glass substrate 304 and the lower glass substrate 307 are positioned relative to each other so that the printed spacer powder pattern and the contacting pattern of the barrier ribs 309 may be in register with each other. At the present stage, since the surface of the intermediate sheet 303 is uneven, the gap of the liquid crystal cell is not uniform. Subsequently at step S6, liquid crystal injection processing is performed. For example, air is removed from the inside of the liquid crystal cell 301 once, and then, liquid crystal is injected into the inside of the liquid crystal cell 301 under the atmospheric pressure. In this instance, since the spacer particulates 311 are fixed to the upper glass substrate 304, even if the liquid crystal flows in the inside of the liquid crystal cell 301, the spacer particulates 311 are not moved by the flow of the liquid crystal at all. At the present stage, since the inside of the liquid crystal cell 301 is in an atmospheric pressure condition, the intermediate sheet 303 still remains pressed against the plasma cell 302 by the negative pressure. Then at step S7, the inner pressure of the liquid crystal cell 301 is adjusted so that it may be lower than the inner pressure of the plasma cell 302.

It is to be noted that the inner pressure adjustment may alternatively be performed simultaneously at the liquid crystal injection step. As a result, the negative pressure now operates reversely so that the intermediate sheet 303 is pressed against the liquid crystal cell 301. Since the spacer particulates 311 sprayed in a pattern with a predetermined density is present in the gap of the liquid crystal cell 301, they act as support posts so that the cell gap can be maintained uniform over the entire screen of the plasma addressed liquid crystal display device. Finally at step S8, the injection opening for liquid crystal is closed up. In this instance, by applying heating processing, the particulates 311 can be adhered and fixed also to the intermediate sheet 303.

Figure 20:
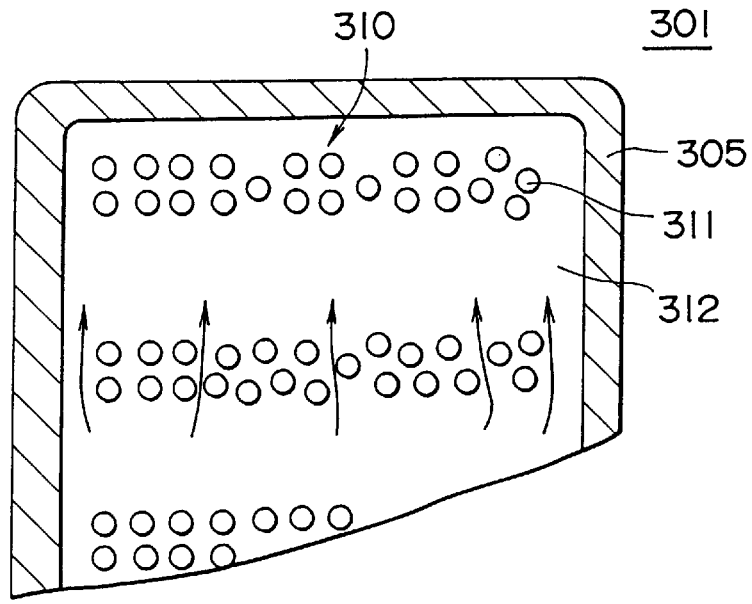
FIG. 20 is a schematic diagrammatic view illustrating a liquid crystal injection step in manufacture of the plasma addressed liquid crystal display device of FIG. 18.

FIG. 20 is a schematic view illustrating the liquid crystal injection step S6. As seen in FIG. 20, the cell 301 has an internal space 312 surrounded by the seal member 305, and an adhesive spacer 310 is present in the internal space 312 of the cell 301 and is disposed in a stripe pattern. As described hereinabove, the adhesive spacer 301 is formed from an aggregate of the discretely distributed particulates 311. Since some gaps are left among the particulates 311, liquid crystal injected in such a manner as indicated by arrow marks can freely pass between the particulates 311, and consequently, smooth and rapid injection processing can be performed.

Figure 21:
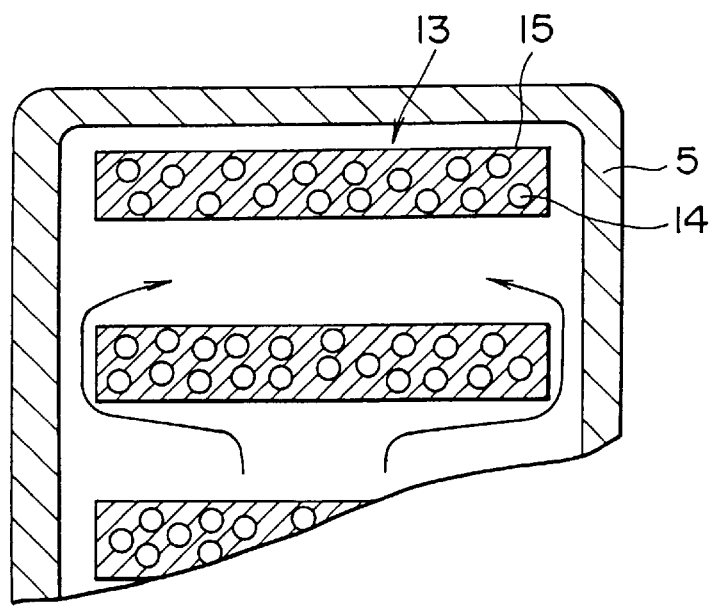
FIG. 21 is a similar view but illustrating a liquid crystal injection step for reference.

Meanwhile, FIG. 21 is a schematic view illustrating the liquid crystal injection step where the adhesive spacer 13 made of paste is employed. As seen from FIG. 21, the adhesive spacer 13 is constituted from the bonding agent 15 in which the particulates 14 are dispersed. Accordingly, liquid crystal injected in such a manner as indicated by arrow marks is blocked by the adhesive spacer 13, and consequently, the flow route of the liquid crystal is limited to the gaps between the adhesive spacer 13 and the seal member 5. Consequently, smooth and rapid liquid crystal injection processing is obstructed. Accordingly, in the plasma addressed liquid crystal display devices of the first to fourth embodiments described above, preferably the adhesive spacers 13 are printed not in a stripe pattern but in a dot pattern.

Figure 22:
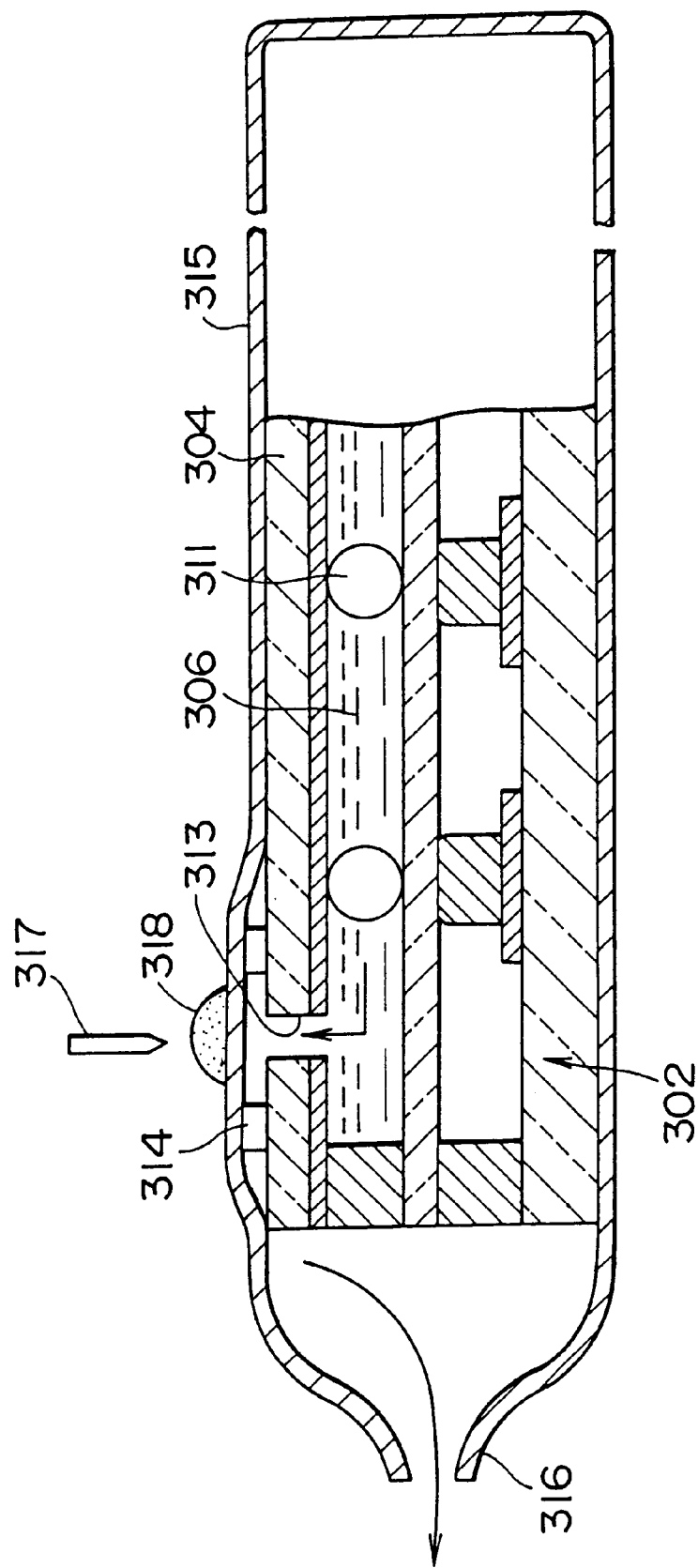
FIG. 22 is a schematic sectional view illustrating a step of adjusting the inner pressure of a liquid crystal cell of the plasma addressed liquid crystal display device of FIG. 18.

FIG. 22 is a schematic view illustrating an example of the liquid crystal cell inner pressure adjusting step S7. In FIG. 22, the liquid crystal 306 is injected under the atmospheric pressure once, and then the inner pressure of the liquid crystal cell 301 is adjusted. It is to be noted that the present method is a mere example and the present invention is not limited to the specific method. An injection opening 313 is formed in a portion of the upper glass substrate 304 so that the liquid crystal cell 301 is communicated with the outside through the injection opening 313. A plurality of projections 314 are provided on the outer face of the upper glass substrate 304 around the injection opening 313. After the liquid crystal 306 is injected into the liquid crystal cell 301, the entire panel is accommodated into the inside of a tube 315. Air is removed from the tube 315 through the opening 316 to a predetermined degree of vacuum. The degree of vacuum is set lower than the inner pressure of the plasma cell 302. The liquid crystal cell 306 injected under the atmospheric pressure is sucked as indicated by an arrow mark, and at a point of time when the inner pressure of the liquid crystal cell 301 becomes equal to the sucking force, the liquid crystal 306 stops from flowing out. Thereafter, a needle 317 is pierced into the tube 315 and a predetermined enclosing material 318 is supplied to fill up the injection opening 313. As a result, the liquid crystal cell 306 is closed up by a sealing member 318 while maintaining a predetermined internal pressure.

Having now fully described the invention, it will be apparent to one of ordinary skill in the art that many changes and modifications can be made thereto without departing from the spirit and scope of the invention as set forth herein.

What is claimed is:

1. A plasma addressed liquid crystal display device, comprising:

a first substrate having a plurality of striped data electrodes formed substantially in parallel on a major surface thereof;

a second substrate opposed to the first substrate and having a plurality of discharge electrodes in a direction perpendicular to the data electrodes;

an intermediate sheet positioned between the first and second substrates, so that a discharge chamber is formed between the intermediate sheet and the second substrate;

a plurality of barrier ribs of which top surfaces make contact with one side of the intermediate sheet, to form a contacting pattern of the barrier ribs, said barrier ribs forming recesses therebetween for containing gas; and an adhesive spacer provided between the first substrate and the intermediate sheet to determine a thickness of liquid crystal layer, said adhesive spacer having a pattern corresponding to the contacting pattern, whereby the adhesive spacer is adhered to the other side of the intermediate sheet.

2. A plasma addressed liquid crystal display device as claimed in claim 1, wherein said adhesive spacer pattern comprises a dot-shaped pattern.

3. A plasma addressed liquid crystal display device as claimed in claim 1, wherein said barrier ribs are formed of an insulating material.

4. A plasma addressed liquid crystal display device as claimed in claim 3, wherein one of said barrier ribs is aligned with each of the discharge electrodes.

5. A plasma addressed liquid crystal display device as claimed in claim 4, wherein said barrier ribs are non-continuous barrier ribs formed on the discharge electrode.

6. A plasma addressed liquid crystal display device as claimed in claim 3, wherein said barrier ribs are arranged in a direction perpendicular to the discharge electrodes.

7. A plasma addressed liquid crystal display device as claimed in claim 1, wherein each of said barrier ribs comprises an electrically conductive material partly so that the side portion of the electrically conductive material is comprised of each of the discharge electrodes.

8. A plasma addressed liquid crystal display device as claimed in claim 3, wherein said barrier ribs comprise a base portion and upper ends which comprise the contacting pattern, the base portion being arranged along by each discharge electrode.

9. A plasma addressed liquid crystal display device as claimed in claim 8, wherein said upper ends have a flattened surface formed by a polishing.

10. A plasma addressed liquid crystal display device as claimed in claim 8, wherein said barrier ribs have a stacked structure of the bare portion and upper ends formed by a polishing procedure.

11. A plasma addressed liquid crystal display device as claimed in claim 1, wherein each of said barrier ribs is formed on one of said discharge electrodes.

12. A plasma addressed liquid crystal display device as claimed in claim 11, wherein said barrier ribs have a width smaller than the discharge electrode.

13. A plasma addressed liquid crystal display device as claimed in claim 1, wherein said adhesive spacer comprises particulates coated by an adhesive.

14. A plasma addressed liquid crystal display device as claimed in claim 13, wherein said particulates are deposited along by the contacting pattern of the barrier ribs.

15. A plasma addressed liquid crystal display device as claimed in claim 14, wherein said particulates are formed by a screen printing.

16. A plasma addressed liquid crystal display device as claimed in claim 1, wherein a uniform liquid crystal layer is controlled by setting an inner pressure of the discharge chamber higher than that of the liquid crystal layer.

17. A plasma addressed liquid crystal display device as claimed in claim 1, wherein said adhesive spacer is located in inactive area of display region.

* * * * *